United States Patent
Hill et al.

(10) Patent No.: US 7,542,842 B2
(45) Date of Patent: Jun. 2, 2009

(54) METHOD FOR CONTROLLING COMBUSTION IN AN INTERNAL COMBUSTION ENGINE AND PREDICTING PERFORMANCE AND EMISSIONS

(75) Inventors: Philip G. Hill, Vancouver (CA); Mark E. Dunn, Vancouver (CA); Guowei Li, Vancouver (CA); Dehong Zhang, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 12/136,740

(22) Filed: Jun. 10, 2008

(65) Prior Publication Data

US 2008/0306674 A1 Dec. 11, 2008

Related U.S. Application Data

(62) Division of application No. 10/573,393, filed as application No. PCT/CA2004/001735 on Sep. 23, 2004, now Pat. No. 7,392,129.

(30) Foreign Application Priority Data

Sep. 23, 2003 (CA) .................................. 2441686

(51) Int. Cl.
 F02D 41/30 (2006.01)
 F02D 41/38 (2006.01)
(52) U.S. Cl. ..................... 701/105; 123/478; 60/602
(58) Field of Classification Search ................ 701/102, 701/104, 105, 108, 110, 111, 114; 123/299, 123/478, 479, 434–436, 300, 480, 490; 60/601, 60/602, 605.2; 73/114.03–114.06, 114.15, 73/114.43, 114.45, 114.51, 114.53
See application file for complete search history.

(56) References Cited

U.S. PATENT DOCUMENTS 6,286,482 B1 9/2001 Flynn et al.

(Continued)

FOREIGN PATENT DOCUMENTS

EP 0877309 6/2000

OTHER PUBLICATIONS

Miyake, M., et al., "The development of high output, highly efficient gas burning diesel engines", CIMAC (International Council on Combustion Engines), 1983.

(Continued)

*Primary Examiner*—Stephen K. Cronin
*Assistant Examiner*—Johnny H. Hoang
(74) *Attorney, Agent, or Firm*—McAndrews, Held & Malloy, Ltd.

(57) ABSTRACT

This disclosure teaches a method of controlling a direct injection internal combustion engine and predicting the behavior of a direct injection internal combustion engine. An estimation of initial cylinder pressure, air flow and EGR flow (if applicable) is used to establish a system that provides engine behavior by integrating an injection module, combustion module and engine control module to provide data indicative of engine behavior such as brake torque and power, air flow, EGR flow, cylinder pressure, brake specific fuel consumption, start of combustion, heat release rate, turbo-charger speed and other variables. These values can then be used to adjust commanded variables such as start of injection, commanded pulse width, rail pressure to meet operator demand. Also the output data can be used as a tool to determine how a conceptualized engine design will behave. This is particularly useful for gaseous-fuelled internal combustion engines where cylinder pressure influences behavior of injected gases in light of the fact that rail pressure and cylinder pressure are, generally, of a similar magnitude.

27 Claims, 6 Drawing Sheets

U.S. PATENT DOCUMENTS

| | | | |
|---|---|---|---|
| 6,353,791 | B1 | 3/2002 | Tuken et al. |
| 6,513,485 | B2 | 2/2003 | Ogawa et al. |
| 6,560,526 | B1 | 5/2003 | Matekunas et al. |
| 6,640,773 | B2 * | 11/2003 | Ancimer et al. ............. 129/299 |
| 6,679,200 | B2 * | 1/2004 | Dingle ...................... 123/1 A |
| 6,704,638 | B2 * | 3/2004 | Livshiz et al. ............... 701/102 |
| 6,708,905 | B2 | 3/2004 | Borissov et al. |
| 6,779,511 | B2 | 8/2004 | Tonetti et al. |
| 6,782,868 | B1 * | 8/2004 | Doering ..................... 123/333 |
| 6,823,834 | B2 * | 11/2004 | Benson et al. ............. 123/299 |
| 6,832,977 | B2 * | 12/2004 | You .......................... 477/161 |
| 6,907,338 | B2 * | 6/2005 | Frankl et al. ............... 701/104 |
| 7,020,554 | B2 | 3/2006 | Roduner et al. |
| 7,165,518 | B2 | 1/2007 | Ervin et al. |
| 7,277,790 | B1 | 10/2007 | Green et al. |
| 2003/0106531 | A1 * | 6/2003 | Saeki et al. ................. 123/435 |

OTHER PUBLICATIONS

Tice, J.K., et al., "Field Test and Development of a Low-Cost Mechanically Actuated, Enhanced Mixing System for Emissions Reduction", Gas Machinery Conference Proceedings, Oct. 2003, Salt Lake City.

* cited by examiner

METHOD FOR CONTROLLING COMBUSTION IN AN INTERNAL COMBUSTION ENGINE AND PREDICTING PERFORMANCE AND EMISSIONS

CROSS-REFERENCE TO RELATED APPLICATION(S)

This application is a divisional of U.S. patent application Ser. No. 10/573,393, scheduled to issue on Jun. 24, 2008 as U.S. Pat. No. 7,392,129, having a filing date under 35 U.S.C. §§371(c)(1), (2) and (4) of Dec. 11, 2006. The '393 application, in turn, was a national phase filing under 35 U.S.C. §371 of International Application No. PCT/CA2004/001735, having an international filing date of Sep. 23, 2004, entitled "Method For Controlling Combustion In An Internal Combustion Engine And Predicting Performance And Emissions". The '735 international application claimed priority benefits, in turn, from Canadian Patent Application No. 2,441,686 filed Sep. 23, 2003. The '393 application and the '735 international application are each hereby incorporated by reference herein in their entirety.

FIELD OF THE INVENTION

The present invention relates to a method for controlling combustion, performance and emissions of a direct injection internal combustion engine and predicting the behavior of a direct injection internal combustion engine. An embodiment of the subject method is particularly useful for gaseous-fuelled direct injection internal combustion engines.

BACKGROUND OF THE INVENTION

Accurate prediction of the behavior of internal combustion engines without engine testing can be valuable. First, predicting how an engine will perform under a set of conditions can reveal valuable information without having to incur the cost and time involved in testing an actual engine. Second, expensive prototype refinement is not unusual when testing a new engine design. Predicting behavior of a concept without having to manage prototype development can be a helpful step in engine research accommodated by methods of predicting engine behavior. Accurate engine behavior prediction helps overcome these problems by initially testing new ideas for a new engine design or simulating an existing engine architecture prior to any investment in costly prototype parts or time consuming test cell work. Finally, methods of predicting engine behavior can allow for accelerated testing of a potential system without limitation of manpower and facility availability. While not a substitute for actual testing, accurate prediction can eliminate many otherwise reasonable ideas before an expensive test engine is built or before valuable test cell time is used to test an existing engine.

Additionally, as computer processing power continues to improve, open loop controls using engine prediction data can eliminate both closed loop control methods and reliance on expensive monitoring equipment and the associated costly electrical systems, both of which are prone to wear.

Finally, as emissions controls become increasingly important for environmental reasons, it is valuable to provide a controller for closed loop on-board control adjusting emissions in response to predicted behavior for a set of user demanded operational conditions. Also, as is the case in engine design noted above, a predictive system can help to filter out new designs that fail to meet acceptable emission levels.

Prior art in this area has provided, in general, systems that predict aspects of engine operation but fail to satisfactorily integrate these to provide a predictive engine. By way of example, combustion models have been developed that predict combustion within a combustion chamber on the basis of operator inputted values. The same is true of emissions models, injector models and engine cycle models.

Examples of engine combustion models development are summarized in Heywood, J. B., *Internal Combustion Engine Fundamentals* (New York: McGraw-Hill, 1988). The combustion model is typically integrated into the engine cycle model. Often accompanying these combustion models are emission formation models that provide an indication of NOx and particulate matter emission. Engine cycle simulation is used to compute thermodynamics and gas dynamics in the engine. GT-Power™ is an example of an engine cycle process modeling module. For engine cycle prediction, several methods have been provided in such systems as StarCD™, Fluent™, FIRE™ and VECTIS™. Hydsim™ software is an example of a prior art injector simulation model. The software can compute injection delay, injection rate shape by modeling details of the injector, including its hydraulic system, mechanical system and electronic system.

Each of these components has been developed, to a greater or lesser extent, but, in general, remain independent models of one aspect of engine behavior. By way of example, consider A. Chow et al., *Thermodynamic modeling of complete engine systems—a review* (London: Professional Engineering Publishing, 1999) and T. Morel et al., *"Virtual Engine/Powertrain/Vehicle" Simulation Tool Solves Complex Interacting System Issues* (Warrendale, Pa.: Society of Automotive Engineers International, 2003) 2003-01-0372. In each case, examples of models used to describe aspects of an engine are provided.

Chow discusses the system integration of models which determine engine behavior for a specified rate of combustion. These models quantitatively represent heat transfer, fluid flow, turbo-machinery, and emissions production. As one example of a system integration, Morel describes software which, for a specified rate of combustion, provides a system integration of separate models for heat transfer, fluid flow, turbo-machinery, and hydraulic, electrical, thermal, mechanical, and controls elements of the engine system. Other prediction methods discussed by Morel include components with turbocharger, supercharger and intercooler support; co-simulation options; transient pipe temperature analysis; variable pipe length; multi-user database and dynamic valve motion. The methods taught emphasize the relationship of the engine valves with other components.

Generally, the integrations discussed do not explicitly include the interaction between fuel injection behavior and the rate of combustion. Full engine simulation integration benefits if the method allows for the interdependence of injector performance, combustion pressure and combustion rate.

Generally, limited development in integrated engine predictive methods for direct injection engines has been due, in part, to individual component modeling for direct injection diesel fuelled engines that has been satisfactory for the purposes of modeling such engines. For example, the changing conditions inside the combustion chamber caused by combustion in a diesel engine has limited influence on the injection of diesel fuel due, largely, to the extremely high pressures at which diesel fuel is injected, so an integrated model that adjusts the fuel delivery to a cylinder in response to the cylinder pressure does not suffer to any significant extent by ignoring combustion of the fuel in the cylinder. That is, compared to the pressures established in the combustion chamber as a result of combustion events, the pressure at which diesel fuel is injected is many times higher and, therefore, less influenced by changes in combustion chamber pressure.

However, ignoring this part of an engine system for a predictive model can be a problem when a gaseous fuel is used to operate high compression ratio direct injection engines. For diesel engines operating on gaseous fuels, the fuel injection rate depends in general on pressure in the combustion chamber; however the rate of change of cylinder pressure depends on the injection rate, as well as on the turbo-machinery and heat transfer components. Thus for a full system integration separate models for predicting injector behavior and combustion development are important. These models exist independently but have not been adequately integrated into a full system applicable to diesel engines, or engines with diesel engine compression ratios, where those engines operate on gaseous fuels.

Most component models simulate aspects of an engine removed from the operation of the engine system as a whole. The interface between the modeled components and the rest of the system is based on engine test measurements or data. Therefore, the model is not a self-supported full-predictive model. The models are applied to understand the engine process for diagnostic purpose.

As noted above, in injector computation, the model upstream conditions, such as rail pressure and temperature, are from measurements that, in general, do not consider fluctuations in pressure, which might be quite significant in some cases. This is especially important when gas fuel injection is involved. In combustion models, the intake conditions are usually from test measurements on a functioning engine. There is little consideration of the interaction between the injection and the combustion. Likewise, in engine cycle simulation, the combustion process is often derived from the heat release rate measured on an actual engine. This ignores the effect of the intake conditions on the combustion process and simplifies the interaction between injection, combustion and air intake and management processes. It is believed that the interaction between components in the engine system is very important and needs to be well understood in order to shorten engine development phase. However, it is also very complex. Most engine models do not reflect the complex interactions in engine system. Models are detached from the system reducing a model's predictive capability.

Moreover, until recently computer power, has not been adequate to accurately integrate modeling components to predict overall engine behavior in a time frame useful for the purposes contemplated. Developments in computer processing power have provided the necessary computational capacity to model an integrated engine.

Efforts to integrate sub-models together have, in general, not resulted in integrated fuel systems, combustion system and engine breathing systems (as well as emissions systems). In particular, modeling efforts have not been developed for such a predictive integrated system for a gaseous-fuelled engine. Also, while the focus of efforts to create engine predictive methods has been directed to the purpose of providing an engine diagnostics tool and predicting engine behavior, little effort has been made on the use of such methods for engine controls.

The present method discloses an integrated engine prediction tool for controlling and predicting engine performance and emissions.

SUMMARY OF THE INVENTION

The present invention provides for an integrated engine model and method for predicting and controlling a direct injection fuelled engine and especially a gaseous-fuelled direct injection engine.

A method is disclosed for controlling a direct injection internal combustion engine by calculating output data from system data. The method comprises using system data which includes an injector geometry defined by a fuel injector in fluid communication with a combustion chamber of the engine, an engine geometry defined by the engine, an engine operating command based on a desired engine output, that is indicative of a commanded torque for the engine, an initial injector command, and an engine speed. The output data comprises an engine out value indicative of a brake torque delivered by the engine, and an output control parameter indicative of a cylinder pressure value. When the output data does not satisfy a predetermined relationship, it is recalculated with a determined subsequent injector command. This predetermined relationship compares the output data, the engine operating command and a demanded control parameter. The demanded control parameter is indicative of a maximum cylinder pressure value. When the output data satisfies the predetermined relationship, the injector is commanded to provide fuel to the combustion chamber according to a last injector command.

In a further embodiment of method, the system data can also comprise an ambient temperature, an ambient pressure and an engine speed, which in a preferred embodiment are measured prior to calculating the output data. In a further embodiment of the present method, the engine operating command is converted to the commanded torque based on an operator selected pedal position.

In a further embodiment of the method, the demanded control parameter is determined from the engine operating command. As well, the output control parameter is indicative of calculated emissions and the demanded control parameter is indicative of a demanded emission. The calculated emissions and the demanded emissions are indicative of NOx and/or particulate matter concentration.

A further embodiment of method discloses the predetermined relationship comprising comparing the output data with a previously calculated fuel consumption determined from the system data using the initial or subsequent injector commands. The output data further comprises the calculated fuel consumption. To meet the predetermined relationship, the calculated fuel consumption is less than the previously calculated fuel consumption.

In a further embodiment of method, the initial injector command comprises commanding initial start of injection, an initial pulse width and an initial rail pressure. The subsequent injector command comprises commanding a subsequent start of injection, a subsequent pulse width and subsequent rail pressure. And the last injector command comprises commanding a last start of injection, a last pulse width and a last rail pressure.

A further embodiment of method discloses a variable geometry turbine. The system data may comprise variable turbine geometry positions. The injector commands include the last variable geometry turbine positions when the output data satisfies the predetermined relationship. When the output data does not satisfy the predetermined relationship, a subsequent variable geometry turbine position, with the subsequent injector command, is used to recalculating with the output data.

In a further embodiment of the method the engine comprises an exhaust gas recirculation (EGR) system. The system data further comprises an initial effective EGR valve flow area, further comprising, when the output data does not satisfy the predetermined relationship, determining a subsequent effective EGR valve flow area with the subsequent effective EGR valve flow area and the subsequent injector command, The output data being recalculated when the output data satisfies the predetermined relationship resulting in commanding the EGR system according to a last effective EGR valve flow area.

In a further embodiment of the method, the output data is calculated using an injector module for calculating IM/CM data and IM/ECM data from an estimated initial cylinder pressure and IM system data. The IM system data is a subset of the system data. Also, a combustion module for calculating CM/ECM data from an estimated initial intake flow rate, the IM/CM data and CM system data is used. The CM system data is a subset of the system data. Also, an engine cycle module for calculating the output data from the CM/ECM data, the IM/ECM data and the ECM system data is used. The ECM system data is a subset of the system data. Prior to calculating the output data, a small loop between the combustion model and the engine cycle module is used to provide a converged intake flow rate. A big loop between the injection, combustion and engine cycle modules is used to provide a converged cylinder pressure, which then provides the cylinder pressure value.

In a further embodiment of the present method, the IM/CM data can comprise an IM rate of injection and an IM start of injection. An IM fuel flow and an IM start of injection can also be used. As well, the CM/ECM data can comprise a CM heat release rate and a CM start of combustion.

The output data is further calculated using an emissions module for calculating emissions data from ECM/EM data, the IM/ECM data and the system data. The output control parameter is indicative of calculated emissions and the demanded control parameter is indicative of a demanded emission.

Further embodiments of the present method include the IM system data comprising an ambient pressure, the injector geometry, the engine speed and the injector command. The CM system data can further comprise the engine speed and the engine geometry. The ECM system data comprises an ambient pressure, an ambient temperature, the engine geometry and the engine speed.

The method can be practiced wherein the engine is at least partially fuelled by a gaseous fuel and in a preferred embodiment the gaseous fuel is natural gas. The gaseous fuel can also comprise methane, ethanol and propane. In a further preferred embodiment the fuel is hydrogen.

A method is disclosed for predicting output data generated by a direct injection internal combustion engine, comprising at least one of engine torque, fuel consumption, power and cylinder pressure. The method comprises selecting system data which comprises an injector geometry indicative of a selected fuel injector, an engine geometry indicative of the engine, an engine speed and an injector command. The method also comprises estimating initial data, comprising an initial cylinder pressure and an initial intake flow. The output data is calculated using the system data and a converged cylinder pressure and a converged intake flow. The initial data is used to provide the converged cylinder pressure from the initial cylinder pressure, and provide the converged intake flow from the initial intake flow.

In a further embodiment, the system data can comprise either an ambient pressure and/or an ambient temperature while the output data can comprise NOx and/or particulate matter concentration. As well, the injector command may comprise a commanded rail pressure, a commanded start of injection and a commanded pulse width.

In a further embodiment of the present method, system data can comprise a commanded variable geometry turbine position and an effective EGR valve flow area. When an effective EGR valve flow area is included, the system data further comprises an initial EGR flow.

In a further embodiment the output data is calculated using an injector module for calculating IM/CM data and IM/ECM data from the initial cylinder pressure and IM system data. The IM system data is a subset of the system data. Also, a combustion module is used for calculating CM/ECM data from the initial intake flow, the IM/CM data and CM system data. The CM system data is a subset of the system data. Also an engine cycle module is used for calculating the output data from the CM/ECM data, the IM/ECM data and ECM system data. The ECM system data is a subset of the system data. With this, a small loop between the combustion model and the engine cycle module is used to converge to a converged intake flow. As well, a big loop between the injection, combustion and the engine cycle modules is used to converge to the converged cylinder pressure.

In a further embodiment of the method, the output data is further calculated using an emissions module for calculating emissions data from ECM/EM data, the IM/ECM data and EM system data. The EM system data is a subset of the system data. The output data comprises the emissions data, which, in a preferred embodiment, is indicative of NOx concentration and/or a particulate matter concentration.

In a further embodiment, the ECM/EM data comprises the converged cylinder pressure, the converged intake flow, an intake valve closing time cylinder pressure and an intake valve closing time cylinder temperature. The intake valve closing time cylinder pressure and temperature are provided by the engine cycle module.

In a further embodiment of the subject invention, the IM/CM data comprises an IM rate of injection and an IM start of injection. The IM/ECM data comprises an IM fuel flow and an IM start of injection. The CM/ECM data comprises a CM heat release rate and a CM start of combustion. The IM system data can comprise the injector geometry, the engine speed, the ambient pressure and the injector command. The CM system data comprises the engine speed and the engine geometry. The ECM system data comprises the engine geometry, the ambient pressure, the ambient temperature and the engine speed.

The method can be practiced wherein the engine is at least partially fuelled by a gaseous fuel and, in a preferred example, the gaseous fuel is natural gas. The gaseous fuel can also comprise methane, ethanol and propane. In a further preferred example the gaseous fuel is hydrogen.

DETAILED DESCRIPTION OF PREFERRED EMBODIMENT(S)

In the present disclosure, a method is taught to help with engine control, particularly for gaseous-fuelled direct injection internal combustion engines. The method predicts internal combustion engine behavior.

Figure 1:
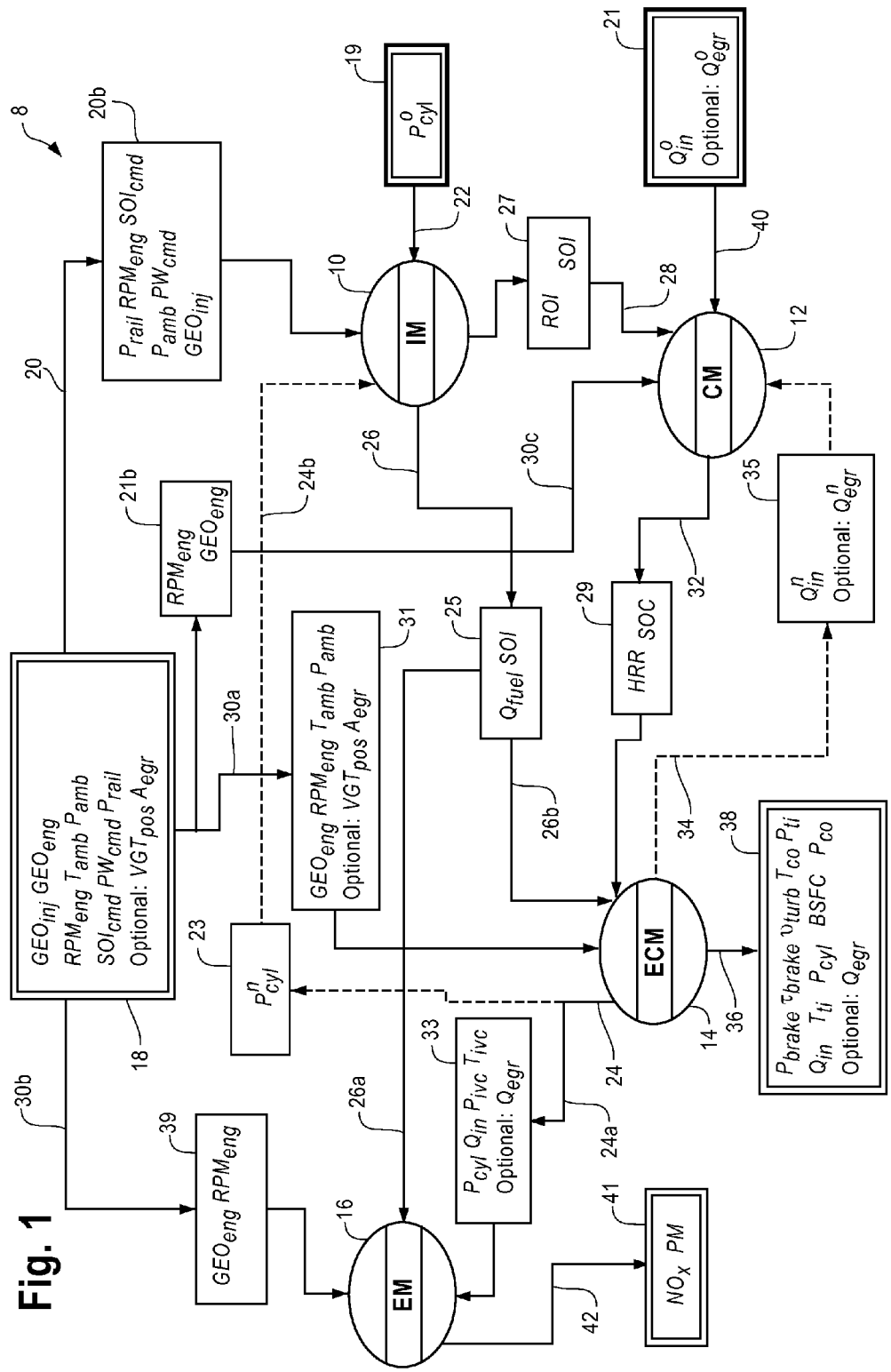
FIG. 1 shows a flow diagram of an integrated engine model for use in engine control or predicting engine behavior.

Referring to FIG. 1, the flow diagram illustrates integrated engine method (IEM) 8. The flow diagram shows the integration of injector module (IM) 10, combustion module (CM) 12, engine cycle module (ECM) 14 and emissions module (EM) 16, each of which calculates output data based on provided input data where the output data is descriptive of the behavior of the injector, the selected combustion mode for the chosen fuel, the engine behavior and the emissions generated by the engine of interest. System data 18 includes geometry parameters and operation parameters, to be described in greater detail below. System data 18 is used to initiate operation of IEM 8. System data 18 lists all data used for IEM 8. Subsets of system data 18, IM system data 20b, CM system data 21b, ECM system data 31 and EM system data 39, each provide system data 18 used for each module.

As well, initial data, namely, initial cylinder pressure ($P_{cyl}^0$) data 19 and initial intake air flowrate ($Q_{in}^0$). Exhaust gas recirculation flow rate ($Q_{egr}^0$) is also provided as initial data in those cases where exhaust gas recirculation (EGR) is used or considered. $Q_{in}^0$ and $Q_{egr}^0$ are, collectively, CM input data 21 where EGR is used and $Q_{in}^0$ alone where it is not used.

Lines with arrowheads represent data paths for routing data throughout IEM 8 between modules 10, 12, 14 and 16, as well as routing system data 18, $P_{cyl}^0$ data 19 and CM input data 21 into IEM 8. Data paths 20, 22 and 24b direct IM system data 20b, $P_{cyl}^0$ data 19, $P_{cyl}^n$ data 23, respectively, to IM 10. Data paths 26 and 28 direct IM/ECM/EM data 25 and IM/CM data 27, respectively, from IM 10 as indicated. IM/ECM/EM data 25 is directed to ECM 14 and EM 16. IM/CM data 27 is directed to CM 12. IM system data 20b, a subset of system data 18 comprises, injector geometry data ($GEO_{inj}$), injector commands, in the embodiment shown rail pressure ($P_{rail}$), commanded start of combustion ($SOI_{cmd}$), and commanded pulse width ($PW_{cmd}$), as well as and engine speed ($RPM_{eng}$) and ambient pressure of the engine of interest ($P_{amb}$).

Data path 24b originates from path 24 and directs $P_{cyl}^n$ data 23 to IM 10 after completion of an iteration of big loop as will be discussed below.

Along with IM/CM data 27 and CM input data 21 directed through path 40), as noted above, CM 12 also takes CM system data 21b through path 30c and generates CM/ECM data 29. After an iteration through ECM 14, as will be described below, CM 12 also uses ECM/CM data 35 directed through path 34 replacing CM input data 21 on subsequent iterations.

ECM 14 uses IM/ECM data 25, CM/ECM data 29 and ECM system data 31 from paths 26b, 32 and 30a, respectfully, to provide $P_{cyl}^n$ data 23, ECM/EM data 33 and ECM/CM data 35 directed to IM 10, EM 16, and CM 12 through paths 24b, 24a, and 34, respectfully. ECM system data 31 is a subset of system data 18. Path 36 provides engine output data 38, which can be generated with each iteration or upon completion of a number of iterations as described below. Path 34 along with path 40, path 28 and path 30c, as noted above, deliver ECM/CM data 35, CM input data 21, IM/CM data 27 and CM system data 21b to CM 12.

Path 24a, 26a and 30b direct ECM/EM data 33, IM/ECM/EM data 25 and EM system data 39, respectively, to EM 16 from ECM 14, IM 10 and system data 18, respectively, wherein EM 16 generates emissions data 41 through line 42. EM system data 39 is a subset of system data 18.

Along with IN system data 20b described above, other data, ECM system data 31, CM system data 21b and EM system data 39, are chosen from system data 18. ECM system data 31 includes engine geometry ($GEO_{eng}$), $RPM_{eng}$, $P_{amb}$ and ambient temperature ($T_{amb}$) EGR valve flow area ($A_{egr}$) and variable geometry turbine position ($VGT_{pos}$) may also be included where these features, EGR and variable geometry turbine (VGT) are used in the engine considered or controlled. Other variable may also be included depending on the engine, as would be understood by a person skilled in the art.

Note while $P_{amb}$ and $T_{amb}$ are components of system data 18 to both IM 10 and ECM 14, they can be assumed or calibrated values and factored into the computational algorithms in both IM 10 and ECM 14 thereby avoiding actually having to provide these as values. This could also be said of $GEO_{eng}$, $GEO_{inj}$ and $RPM_{eng}$, however, the flexibility of the system is limited by setting this parameters as constants. For the purposes of this application, these three parameters will be considered provided as a subset the system data even if they are "hardwired" into the modules that use them.

CM system data 21b and EM system data 39 include $GEO_{eng}$ and $RPM_{eng}$ in both cases. Depending on such things as aftertreatment in the case of EM 16, and the adaptability of EM 16, other variables may be employed.

As would be understood by a person skilled in the art, $GEO_{eng}$ is a reference defined by a number of variables including such things as the engine cylinder diameter, number of cylinders, piston stroke, connecting rod length, clearance height, compression ratio, strokes per cycle (two stroke cycle or four stroke cycle), number of intake and exhaust valves per cylinder, diameters of valves, valve lift and timing diagrams, number of compressors and turbines (if any-although, its assumed for the purposes of this disclosure that these are feature of the engine), size and properties of compressor, size and properties of any turbine.

As would be understood by a person skilled in the art, $GEO_{inj}$, is a reference defined by variables including sizes of injector needles, sizes of plungers, sizes of flow channels and reservoirs, sizes of injector holes and number of injector holes.

Output data, engine output data 38 and emissions data 41, includes power ($P_{brake}$) and torque ($\tau_{brake}$) fuel economy (BSFC), exhaust emissions ($NO_x$, PM), intake air flow ($Q_{in}$), $P_{cyl}$ and temperature and pressure of the turbine inlet ($T_{ti}$, $P_{ti}$) and the compressor outlet ($T_{co}$, $P_{co}$), turbine speed ($v_{turb}$). Where used, EGR rate ($Q_{egr}$) can also be provided with engine output data 38. As would be understood by a person skilled in the art, variables such as exhaust flow ($Q_{exh}$), where important can be found. Heat release rate (HRR), an intermediate parameter out of ECM 14 originally delivered to ECM with CM/ECM data 29 from CM 12, can also be used by the engine cycle model to generate engine performance parameters, such as $P_{brake}$ and $\tau_{brake}$, BSFC, $Q_{in}$, $Q_{egr}$, $P_{cyl}$, $T_{co}$, and $T_{ti}$.

IM/CM data 27, IM/ECM/EM data 25 and CM/ECM data 29, includes rate of injection (ROI), determined start of injection (SOI), in the case of IM/CM data 27. In the case of IM/ECM/EM data 25, SOI and rate of fuelling ($Q_{fuel}$) are included. In the case of CM/ECM data 29, HRR and start of combustion (SOC) is provided. These data sets, 27, 25 and 29, form the basis of two iteration loops used to converge on a $P_{cyl}^{n}$ data 23 set and a ECM/CM data 35 set that more accurately reflects and refines initial input data, $P_{cyl}^{0}$ data 19 and CM input data 12. ECM/CM data 35 includes the current iteration of $Q_{in}$, referred to as $Q_{in}^{n}$, and may or may not include the current iteration of $Q_{egr}$, referred to as $Q_{egr}^{n}$, depending on whether this is a feature of the engine used.

ECM/EM data 33, includes intake valve closing time cylinder pressure ($P_{ivc}$), intake valve closing time cylinder temperature ($T_{ivc}$) as well as $Q_{in}$, $P_{cyl}$, and, where a feature of the system, $Q_{egr}$. With the flow rates of fuel, air, and EGR, pressure and temperature at the intake valve closure, IEM 8 module, EM 16 calculates emissions data 41, such as NOx emission.

Figure 2:
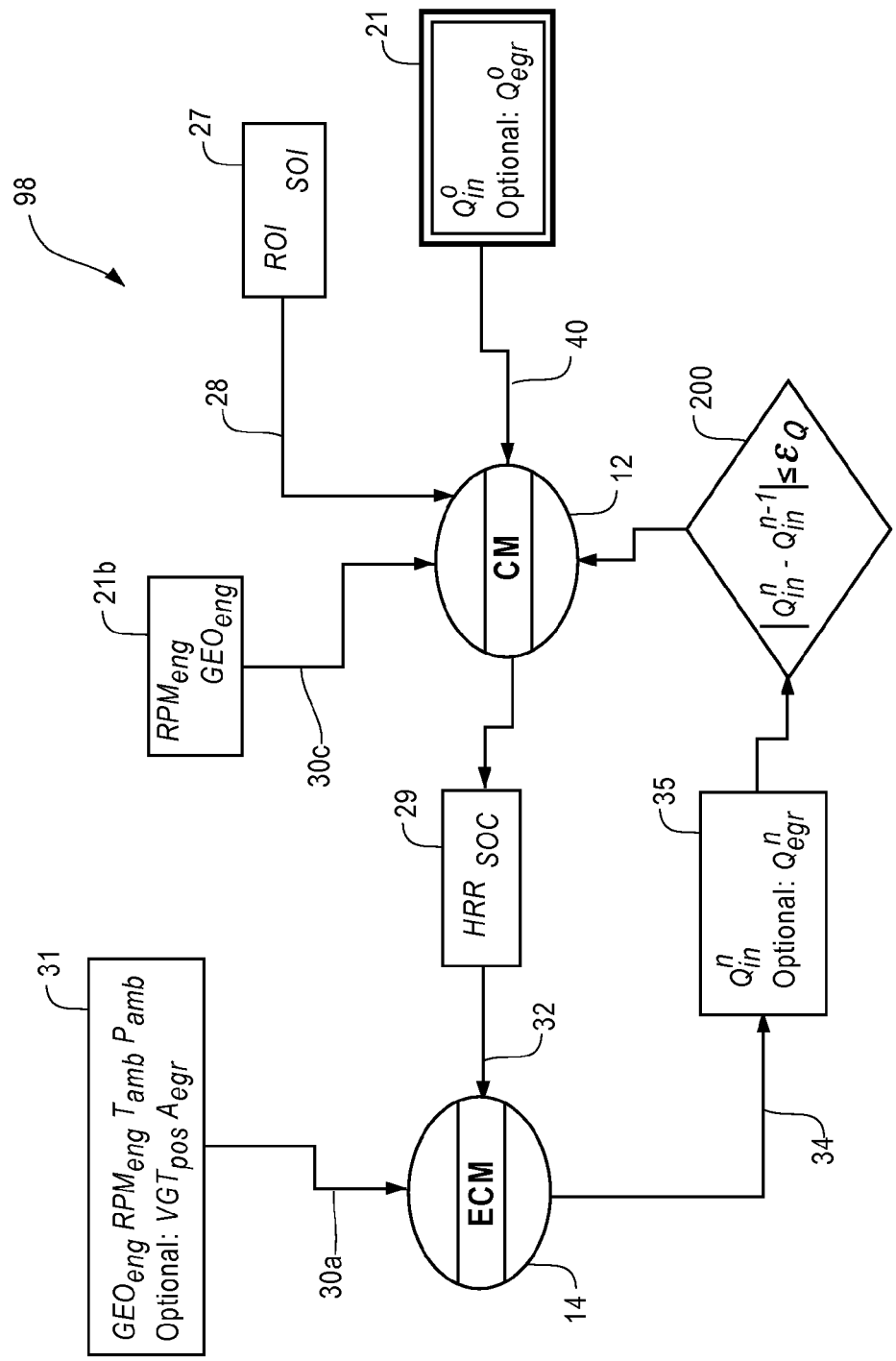
FIG. 2 shows a flow diagram demonstrating a small iteration loop.
Figure 3:
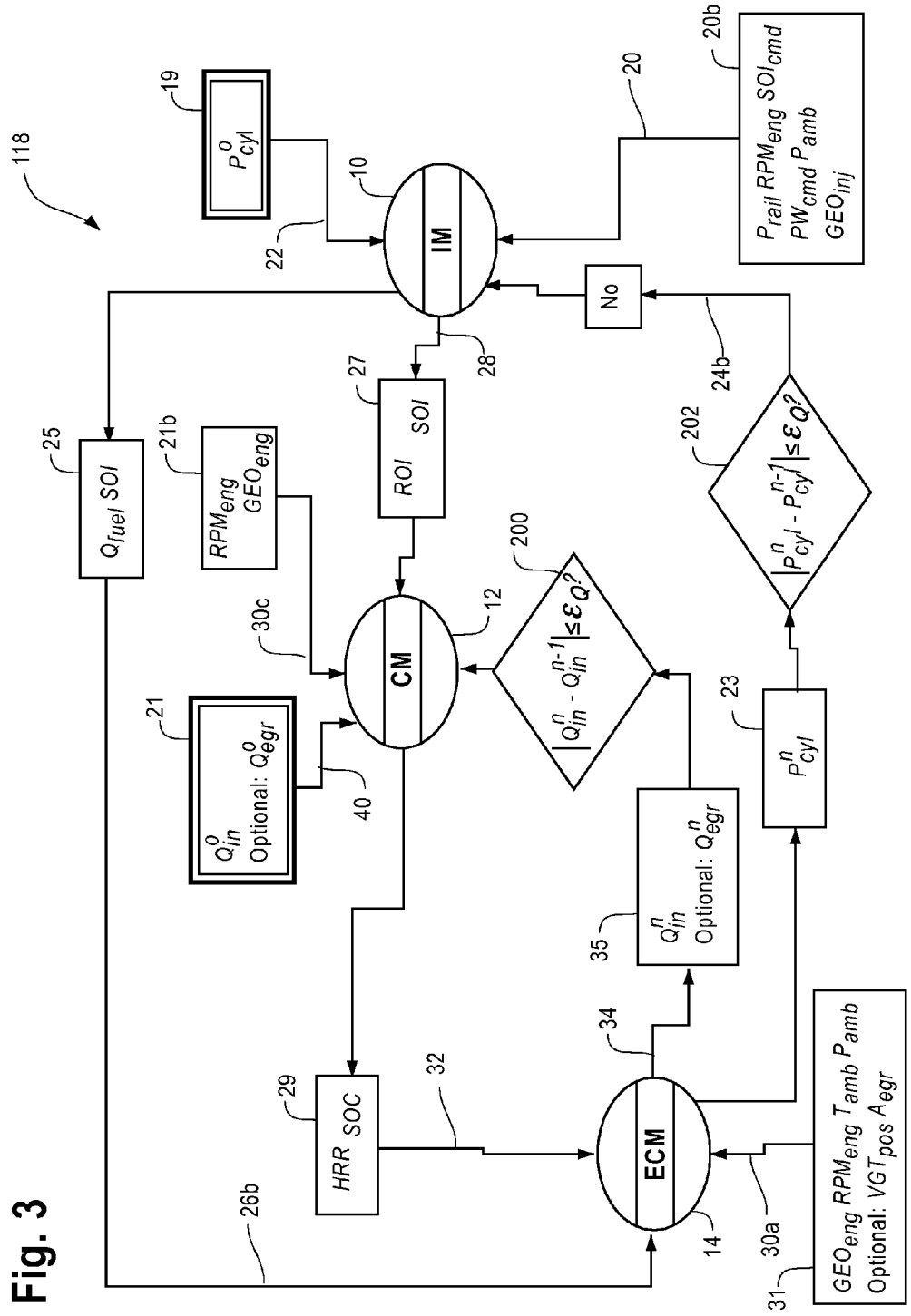
FIG. 3 shows a flow diagram demonstrating a big iteration loop.

Referring to FIGS. 2 and 3, small loop 98 and big loop 118 are iteration algorithms which are used to establish initial input data of sufficient accuracy to allow IEM 8 to begin self supported operation and generate engine output data 38 and emission data 41, as will be discussed below.

Referring to FIG. 2, small loop 98 iteration, initial data, CM input data 21, CM system data 21b and IM/CM data 27, are directed through flow paths 40,30c, 28, respectfully, to CM 12. CM 12 calculates CM/ECM data 29 through path 32 to ECM 14 where, using ECM system data 31, ECM/CM data 35 is provided and directed back to CM 12 in a closed start-up algorithm. ECM/CM data 35 for each iteration, $Q_{in}^{n}$ (and $Q_{egr}^{n}$, where EGR is used), is compared with the previous value provided for ECM/CM data 35, $Q_{in}^{n-1}$ (and $Q_{egr}^{n-1}$ where EGR is used), as seen in small loop convergence step 200.

In FIG. 3, big loop 118 iteration shows the interaction between big loop 118 and small loop 98. Big loop 118 includes IM system data 20b and $P_{cyl}^{0}$ data 19 and, eventually, the current iteration value of $P_{cyl}$ from $P_{cyl}^{n}$ data 23, namely, $P_{cyl}^{n}$, all of which are directed to IM 10 through paths 20, 22, 24b. Resulting IM/CM data 27 is delivered through path 28 to CM 12. CM 12 uses this data, CM system data 21b, CM input data 21 and, eventually, ECM/CM data 35, delivered through paths 30c, 40, 34 to generate CM/ECM data 29. CM/ECM data 29 is delivered through path 32 to ECM 14. ECM 14 performs iterations of small loop 98 to generate $Q_{in}^{n}$ (and, where appropriate $Q_{egr}^{n}$) until this value is converged as discussed below after which, ECM 14 generates $P_{cyl}^{n}$ data 23 delivered through path 24b to IM 10, after completing big loop convergence step 202.

Figure 4:
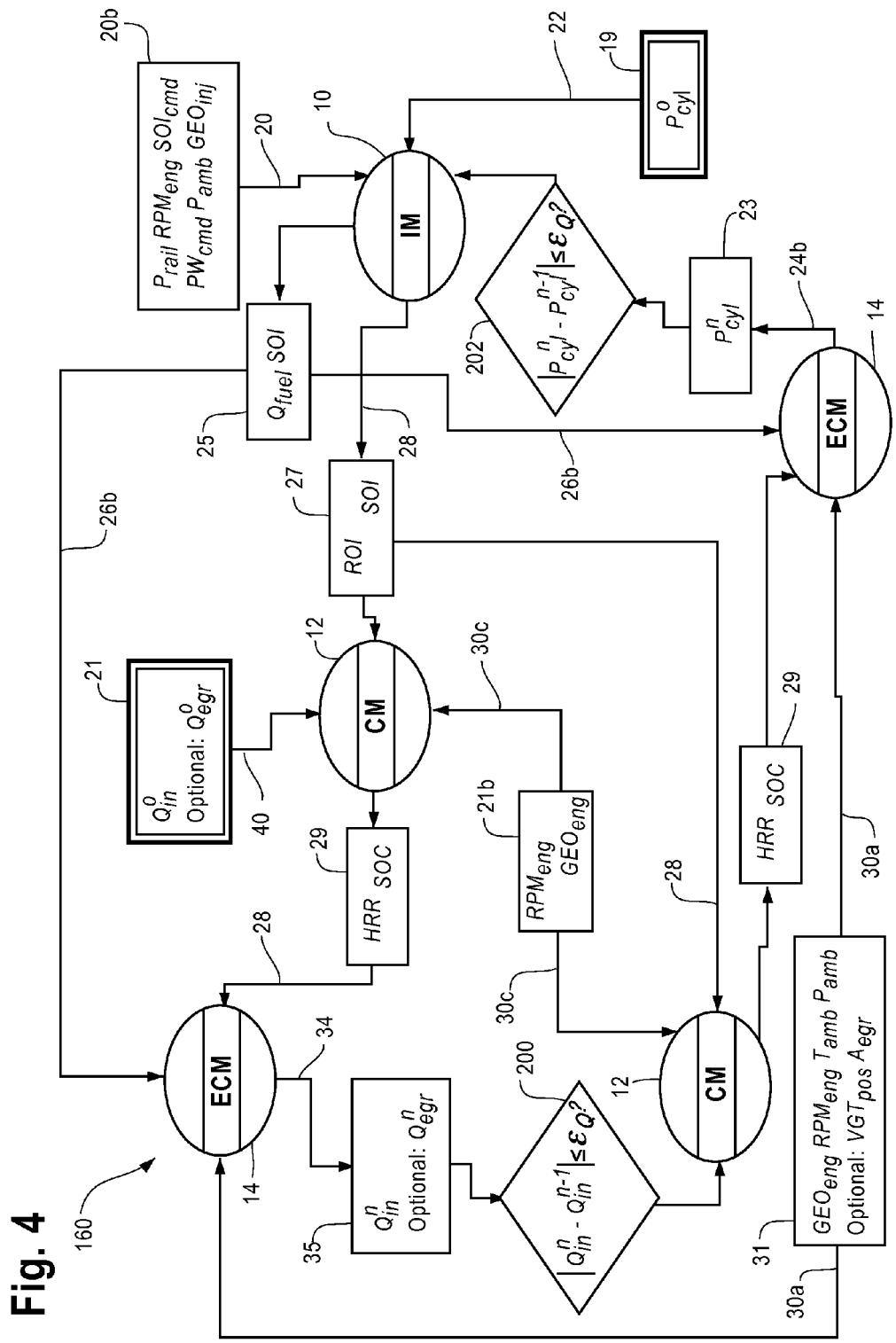
FIG. 4 shows the data flow path of the initial big loop as shown in FIG. 3.
Figure 5:
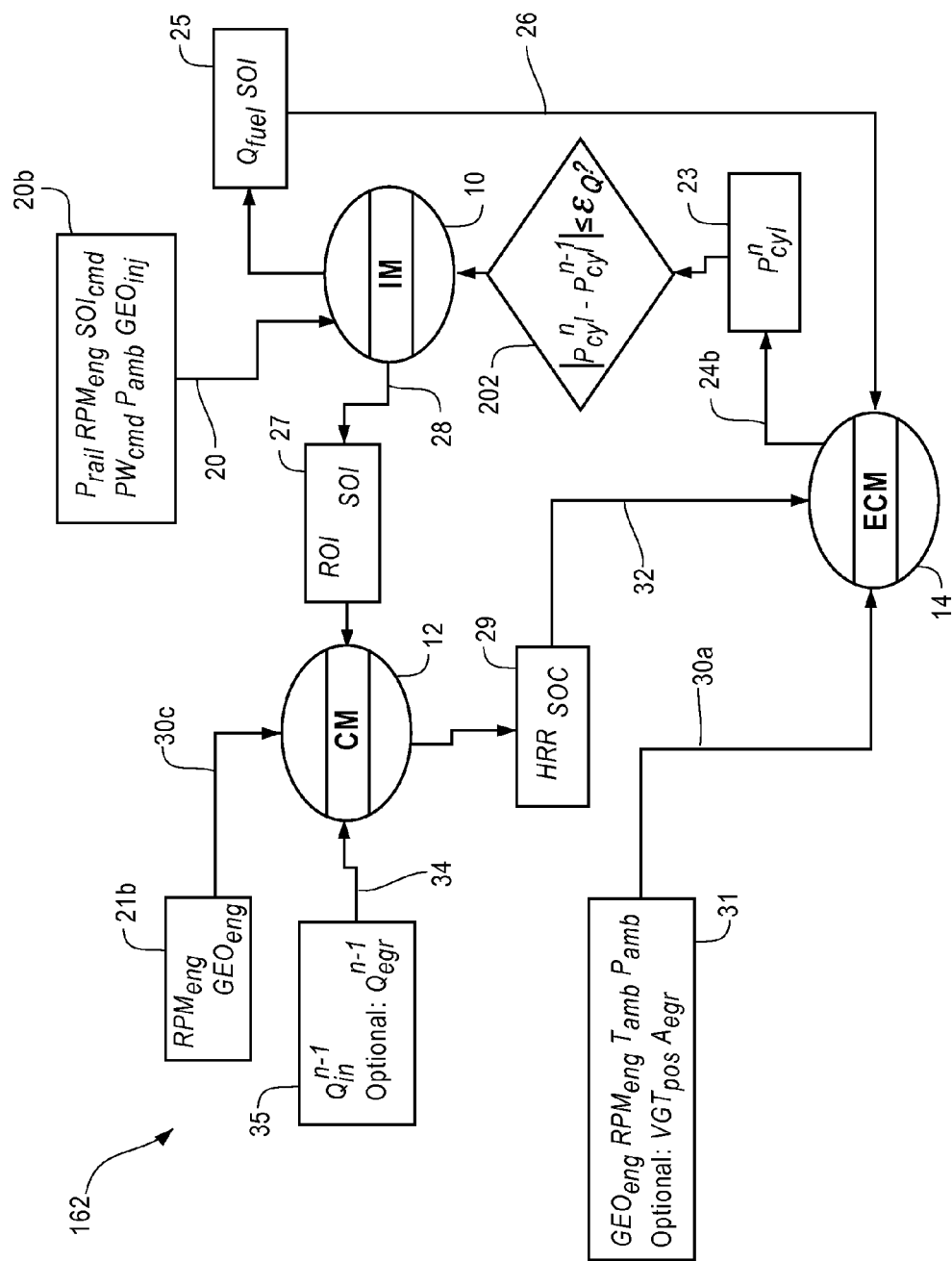
FIG. 5 shows the data flow path (s) for the subsequent big loops subsequent to the initial big loop of FIG. 4.

The data flow paths for big loop 118 are shown in FIGS. 4 and 5. Referring to FIG. 4, initial flow path 160 is provided wherein big loop 118 starts from IM 10, goes through a gas flow loop, returning to IM 10. Subsequent big loop flow path 162 is shown in FIG. 5. Here, IM 10, CM 12 and ECM 14 are cycled through sequentially.

In practice, referring to FIG. 1, each of the modules 10, 12, 14 and 16, requires input data to generate results indicative of that aspect of the engine under consideration. The input data for individual modules is dependent on such things as the control accuracy sought, the demands of the user or operator and the time available for open loop control or engine behavior prediction. In general, certain data is required in order for the controls and engine prediction to be practiced, as would be understood by a person skilled in the art. It is possible to supplement the controls and engine prediction algorithm with additional data depending on the needs of the user, the engine in question and the accuracy sought regarding the resulting data.

An initial estimation is required to begin the subject method. The disclosure utilizes two iteration processes demonstrated in FIGS. 2 through 5, each of which limits the impact of this initial estimation by limiting the estimation to data that is relatively easy to initially estimate and using big loop 118 and small loop 98 to correct for inaccuracies in the initial estimation by performing a converging step on this estimated values.

IEM 8 uses system data 18, namely, geometry data, $GEO_{inj}$, $GEO_{eng}$, operational data, $P_{rail}$, $SOI_{cmd}$, $PW_{cmd}$, $RPM_{eng}$, $T_{amb}$, $P_{amb}$ along with initial data $P_{cyl}^{0}$ data 19 and CM input data 21 to generate output data, engine output data 38 and, if of interest, emissions data 41. CM input data 21 may be limited to $Q_{in}^{0}$ alone where no EGR is used. Also, where used in an engine control, the subject method may not, per se, use $GEO_{inj}$, $GEO_{eng}$, but calculate output data in light of $GEO_{inj}$, $GEO_{eng}$. That is, these geometry "variables" may not be variables in an engine controller as such an engine would maintain the same $GEO_{inj}$ and $GEO_{eng}$ throughout. However, flexibility is also available to allow for variable valve actuation resulting in a variable $GEO_{inj}$ and variable compression ratio resulting in $GEO_{eng}$. Each would be a difficult variable to map allowing IEM 8 to provide real time mapping for engine controls.

$T_{amb}$, $P_{amb}$ and $RPM_{eng}$ can be measured and sent to a controller for control of an engine. These variables could be predetermined for engine behavior prediction. Operational data, $P_{rail}$, $SOI_{cmd}$, $PW_{cmd}$, are operator commanded variables indicative of the demands required by the operator for the engine as translated by a controller or predetermined in view of a sought engine behavior prediction.

As would be understood by a person skilled in the art, additional variables can be added depending on the engine controlled or the engine to be predicted. Examples include $VGT_{pos}$ and $A_{egr}$, as shown in FIG. 1, reflective of an engine with optional components, VGT and EGR. Other variable would need to be included where used with the engine in question.

IEM 8 relies on generation of IM/ECM/EM data 25, CM/ECM data 29, ECM/EM data 33 by models IM 10, CM 12 and ECM 14 to provide engine output data 38 and emissions data 41. Each one of these data sets, 25, 29 and 33, is dependent, however, on $P_{cyl}^{n}$ data 23, and ECM/CM data 35, generated by iterations performed with big loop 118 and small loop 98. That is, IM 10 requires converged values for $P_{cyl}^{n}$ data 23 on subsequent cycles of big loop 118 in order to generate a data set for $P_{cyl}$ useful to provide the output data, 38 and 41. Likewise, CM requires converged values for ECM/CM data 35 on subsequent cycles of small loop 98 in order to generate a data set for $Q_{in}$ (and $Q_{egr}$ where EGR is used) that is useful both for deriving output data, 38 and 41, but also for supporting convergence of $P_{cyl}^{n}$ data 23 through big loop 118.

ECM 14 and EM 16 need initial data in the method taught that is not available through the start-up of the method. Before ECM 14 can generate any useful data, it requires CM/ECM data 29. Likewise, EM 16 requires ECM/EM data 33 prior to generating emissions data 41. As such, there are steps within the taught method that must be performed before the integrated system will perform as a whole. Initially, IM 10 and CM 12 operate with ECM in big loop 118 and small loop 98 within IEM 8, as described below, to generate the first sets of generated data, $P_{cyl}^{n}$ data 23, CM/ECM data 29, ECM/EM data 33, ECM/CM data 35.

Referring to FIGS. 2 and 3, big loop 118 and small loop 98 initiate IEM 8 by stepping through two loops. The method first performs iterations through small loop 98 converging on a $Q_{in}$ (and $Q_{egr}$ where this is used). Once, completed, big loop iteration is continued, converging on a $P_{cyl}$.

Initiating big loop, an estimate of $P_{cyl}$ is made, namely, $P_{cyl}^0$. This allows IM/CM data 27 to be generated. CM 12 is then able to take initially available estimated CM input data 21, $Q_{in}^0$ (and $Q_{egr}^0$ where EGR is used) and CM system data 21b along with IM/CM data 27 to initiate small loop 98. CM 12 generates CM/ECM data 29 which in turn allows ECM to use this data plus ECM system data 31 to provide a first iterated value of $Q_{in}$, specifically, $Q_{in}^1$, and for each subsequent iteration $Q_{in}^n$. Again, where EGR is used, a first iterated value $Q_{egr}^n$ is provided, namely, $Q_{egr}^1$, and for each subsequent iteration $Q_{egr}^n$.

Convergence step 200 is performed wherein the relationship shown is considered. If true, then the convergence step is complete. More generally, this step involves a comparison of the first iteration value of $Q_{in}$, $Q_{in}^1$, to $Q_{in}^0$. In general however, the iteration steps involve the comparison of current $Q_{in}$, $Q_{in}^n$, to the previous value of $Q_{in}$, $Q_{in}^{n-1}$. The absolute value of the difference between $Q_{in}^n$ and $Q_{in}^{n-1}$, $\Delta Q_{in}$, is compared to an error, $\epsilon_Q$, predetermined as acceptable for the application. An additional iteration is performed when $$|\Delta Q_{in}|=|Q_{in}^n-Q_{in}^{n-1}|>\epsilon_Q \qquad (1)$$

and $Q_{in}$ is set such that $Q_{in}=Q_{in}^n$ when $$|\Delta Q_{in}|=|Q_{in}^n-Q_{in}^{n-1}|\leq\epsilon_Q \qquad (2)$$

At this point, small loop iteration is completed for the first cycle of big loop 118.

For the purposes of this application $Q_{in}$ is the converged value of $Q_{in}^n$ defined as $Q_{in}^n$ when $|Q_{in}^n-Q_{in}^{n-1}|\leq\epsilon_Q$.

These values are directed back through CM 12 for subsequent iteration when $|Q_{in}^n-Q_{in}^{n-1}|>\epsilon_Q$. CM 12 again calculates new CM/ECM data 29, HRR and SOC from IM/CM data 27, SOI and ROI, and $GEO_{eng}$ and $RPM_{eng}$, all of which remain the same through each iteration of small loop 98.

The same process is performed to determine $Q_{egr}$, where EGR is used. That is, the absolute value of the difference between $Q_{egr}^n$ and $Q_{egr}^{n-1}$, $\Delta Q_{egr}$, is compared to an error, $\epsilon_{Qegr}$, predetermined as acceptable for the application. An additional iteration is performed when $$|\Delta Q_{egr}|=|Q_{egr}^n-Q_{egr}^{n-1}|>\epsilon_{Qegr} \qquad (3)$$

and $Q_{egr}$ is set such that $Q_{egr}=Q_{egr}^n$ when $$|\Delta Q_{egr}|=|Q_{egr}^n-Q_{egr}^{n-1}|\leq\epsilon_{Qegr} \qquad (4)$$

For the purposes of this application $Q_{egr}$ is the converged value of $Q_{egr}^n$ defined as $Q_{egr}^n$ when $|Q_{egr}^n-Q_{egr}^{n-1}|\leq\epsilon_{Qegr}$.

Upon completion of this step where $Q_{in}=Q_{in}^n$ (and $Q_{egr}=Q_{egr}^n$, where appropriate), with the initial iteration cycle through small loop 98 complete, iteration through big iteration loop continues. Here the resulting first iteration of $P_{cyl}$, $P_{cyl}^1$ in this case, but generally, $P_{cyl}^n$, is sent through convergence step 202 wherein the relationship shown is considered. If true, then the convergence step is complete. More generally, this involves a comparison of the first iteration value of $P_{cyl}$, $P_{cyl}^1$, to $P_{cyl}^0$. In general however, the iteration steps involve the comparison of current $P_{cyl}$, $P_{cyl}^n$, to the previous value of $P_{cyl}$, $P_{cyl}^{n-1}$. The absolute value of the difference between $P_{cyl}^n$ and $P_{cyl}^{n-1}$, $\Delta P_{cyl}$, is compared to an error, $\epsilon_P$, predetermined as acceptable for the application. An additional iteration is performed when $$|\Delta P_{cyl}|=|P_{cyl}^n-P_{cyl}^{n-1}|>\epsilon_P \qquad (5)$$

and $P_{cyl}$ is set such that $P_{cyl}=P_{cyl}^n$ when $$|\Delta P_{cyl}|=|P_{cyl}^n-P_{cyl}^{n-1}|\leq\epsilon_P \qquad (6)$$

At this point, iteration of big loop 118 is completed where $P_{cyl}$ and $Q_{in}$ (and $Q_{egr}$, where EGR is used) are determined allow for completion of IEM 8. Note that each iteration of $P_{cyl}$, where $$|P_{cyl}^n-P_{cyl}^{n-1}|>\epsilon_P \qquad (7)$$

requires a further set of iteration steps through small loop 98 as described above generating an increasingly accurate value for $Q_{in}$.

For the purposes of this application $P_{cyl}$ is the converged value of $P_{cyl}^n$ defined as $P_{cyl}^n$ when $|P_{cyl}^n-P_{cyl}^{n-1}|\leq\epsilon_P$.

Note also, that convergence considering $|\Delta P_{cyl}|$ and $|\Delta Q_{in}|$ can be determined by equivalent means of comparing iterative values of both $P_{cyl}$ and $Q_{in}$ resulting in a determination that the value has converged. These include a direct comparison of the iterative values without determining the absolute value or the difference in the values. As would be understood by a person skilled in the art other methods are also available for assessing convergence of a sought value.

Examples of suitable values for $\epsilon_Q$, $\epsilon_{Qegr}$, $\epsilon_P$ is less than 2% of the resulting $Q_{in}^n$, $Q_{egr}^n$, $P_{cyl}^n$. The value can be much higher or much lower depending on the needs of the operator.

The number of iteration through either big loop 118 or small loop 98 is, in general, determined by the user and the time available for each iteration as balanced against the accuracy sought for the result for the application contemplated. This is provided by the value predetermined for each of $\epsilon_P$ and $\epsilon_Q$, in example method provided.

An advantage of the taught method is that the initial estimated data is limited to $P_{cyl}^0$, and (plus, where EGR is used, $Q_{egr}^0$). As these two values are relatively easy to estimate for engine controls or engine behavior prediction, as would be understood by a person skilled in the art, the efficacy of the control or accuracy of the prediction is determined in large part to these estimations and the accuracy of each module.

While generally a function of time (typically expressed in degrees of crank angle rotation), $P_{cyl}^0$ may also be estimated as a single constant pressure, generally resulting in accurate results after completion of a few iterations of big loop 118 through subsequent big loop flow path 162. In the case of engine control, $P_{cyl}^0$ could come from the last completed predicted data set.

Considering each module, IM 10 uses, along with $P_{cyl}^0$ data 19 in a first iteration and $P_{cyl}^n$ in subsequent iterations, some of system data 18, namely, $GEO_{inj}$, $P_{rail}$, $SOI_{cmd}$, $PW_{cmd}$, $RPM_{eng}$, and $P_{amb}$ to generate data 27, namely ROI and SOI. Each one of IM system data 20b values is provided by the user as a commanded or desired or predetermined value.

Turning to ECM 14, however, as well as a selection of data from system data 18, namely, $GEO_{eng}$, $T_{amb}$, $P_{amb}$ and $RPM_{eng}$, ECM 14 also needs CM/ECM data 29, HRR and SOC, and IM/ECM/EM data 25, SOI and $Q_{fuel}$. These are relatively difficult values to estimate initially as they presume values dictated by an engine's upstream behavior, i.e., actual SOI and not $SOI_{cmd}$, by way of example. However, CM 12 can provide such data along with IM 10. CM 12 uses CM input data 21, (and $Q_{egr}^0$, where used). Along with this value, CM 12 uses IM/CM data 27 as well, namely, SOI and ROI, and system data 18, namely, $GEO_{eng}$ and $RPM_{eng}$, to provide a first iteration of HRR and SOC. This commences small loop 98 wherein, HRR and SOC provided to initiate ECM 14 as described above.

Referring again to FIG. 1 together with FIGS. 4 and 5, data flow through initial big loop flow path 160 and subsequent big loop flow path 162, see FIG. 5, illustrate the derivation of ECM/EM data 33 used by EM 16 along with EM system data 39 IM 10 generated IM/ECM/EM data 25, $Q_{fuel}$ and SOI, to generate emissions data 41. As none of IM 10, CM 12 and ECM 14 use EM 16 generated data, EM 16 as a module can be removed from the iteration process and brought back in when $P_{cyl}$, and $Q_{in}$ (and $Q_{egr}$ where EGR is used) are determined.

The result of IEM 8 is the generation of emissions data 41 and engine output data 38, namely, $NO_x$, PM, $P_{brake}$, $\tau_{brake}$, BSFC, $Q_{in}$, $P_{cyl}$, $v_{turb}$, $T_{co}$, $T_{ti}$, $P_{co}$, $P_{ti}$ and $Q_{egr}$, where EGR is used. Other data can be generated depending on the engine considered and the ECM, CM, IM or EM modules used. The resulting values can be compared to the expected values and a third iteration process can be performed converging such things as $NO_x$, PM, $P_{brake}$, $\tau_{brake}$, BSFC choosing different IM system data 20b and different ECM system data 31 until the result sought is achieved. In effect, this is the iteration process used in practice where an operator will continue to demand, by way of example, more power continuing to adjust values such as $P_{rail}$, $SOI_{cmd}$ and $PW_{cmd}$, where these variables can be adjusted. For example, a driver commanding ever increasing power from the engine will adjust the pedal position at a rate sought to meet his or her needs. As would be understood by a person skilled in the art, the throttle translates into a given $SOI_{cmd}$ and $PW_{cmd}$, in effect, and may in some engines allow for a change in $P_{rail}$ or $Q_{egr}$, where used. These changing variables allow the engine to drive to the demands sought of the driver in this example. Similarly, a sought emissions level can be met by considering the results provided by EM 16 after processing a first set of $P_{rail}$, $SOI_{cmd}$ and $PW_{cmd}$ and then adjusting these to meet the emissions sought while still taking into consideration the other demands of the operator. In the case of controller, once the expected output data matches the actual output data with ECM output data 38 and emissions data 41, the controller will command the engine to operate with the $P_{rail}$, $SOI_{cmd}$ and $PW_{cmd}$ determined. Further discussion is provided below.

The engine prediction application will provide output data indicative of the engine behavior when that data meets the goals of the IEM operator in some respect.

The following table provides an outline of the types of variables that can be considered to provide engine output data 38 and emissions data 41 for a particular engine design:

| Name | Impact on: |
| --- | --- |
| Injector needle diameter | SOI, ROI, Pulse Width (PW), $Q_{fuel}$ |
| Injector tip hole size/number of holes | ROI, $Q_{fuel}$ |
| Injector control chamber plunger diameter | SOI, ROI, PW, $Q_{fuel}$ |
| Injector needle/plunger travel length | ROI, PW, $Q_{fuel}$ |
| Injector needle/plunger springs mass/stiffness | SOI, ROI, PW, $Q_{fuel}$ |
| Injector sac volume | SOI, PW |
| Combustion chamber clearance height-compression ratio | $P_{cyl}$, BSFC |
| Turbo-charger turbine size | $Q_{in}$, $v_{turb}$, intake manifold pressure ($P_{im}$), $P_{cyl}$, $Q_{egr}$ |
| Turbo-charger compressor size | $Q_{in}$, $v_{turb}$, $P_{im}$, $Q_{egr}$ |
| EGR configuration | $Q_{egr}$, BSFC, $NO_x$, PM |
| EGR valve size | $Q_{egr}$ |
| Intake/exhaust valves timing, lift, effective area | Effective Volume ($V_{eff}$), $Q_{in}$, BSFC |
| After treatment devices - pipeline layout | Exhaust temperature ($T_{exh}$), $P_{cyl}$ |
| Command SOI & PW | SOI, ROI, PW, $Q_{fuel}$, $NO_x$, PM |
| Fuel rail pressure | SOI, ROI, PW, $Q_{fuel}$, $NO_x$, PM |
| EGR valve opening | $Q_{egr}$, $NO_x$, PM |
| EGR coolant temperature | EGR temperature ($T_{egr}$), $NO_x$, PM |
| EGR cooler size | $T_{egr}$, $Q_{egr}$, $NO_x$, PM |
| Intake/exhaust restrictions | Flow restriction of intake and exhaust ($\Delta r$), $Q_{egr}$, air to fuel ratio ($\lambda$), BSFC, $NO_x$, PM |
| Elevation/environment temperature | $P_{brake}$, $\tau_{brake}$, $\lambda$, BSFC, $NO_x$, PM |
| $VGT_{pos}$ | $\Delta r$, $Q_{egr}$, $\lambda$, BSFC, $NO_x$, PM |
| Waste gate opening | $\Delta r$, $Q_{egr}$, $\lambda$, BSFC, $NO_x$, PM |
| Valve openings of after treatment devices | Distribution of exhaust flow and temperature |

Note that for gaseous-fuelled engines, a pilot injection feature may be implemented within IM 10 with CM 12 for managing natural gas/pilot fuel combustion typical of a type of gaseous-fuelled direct injection high compression ratio engine. The resulting CM/ECM data 29 can be generated to support the remainder of the method as would be understood by a person skilled in the art.

Figure 6:
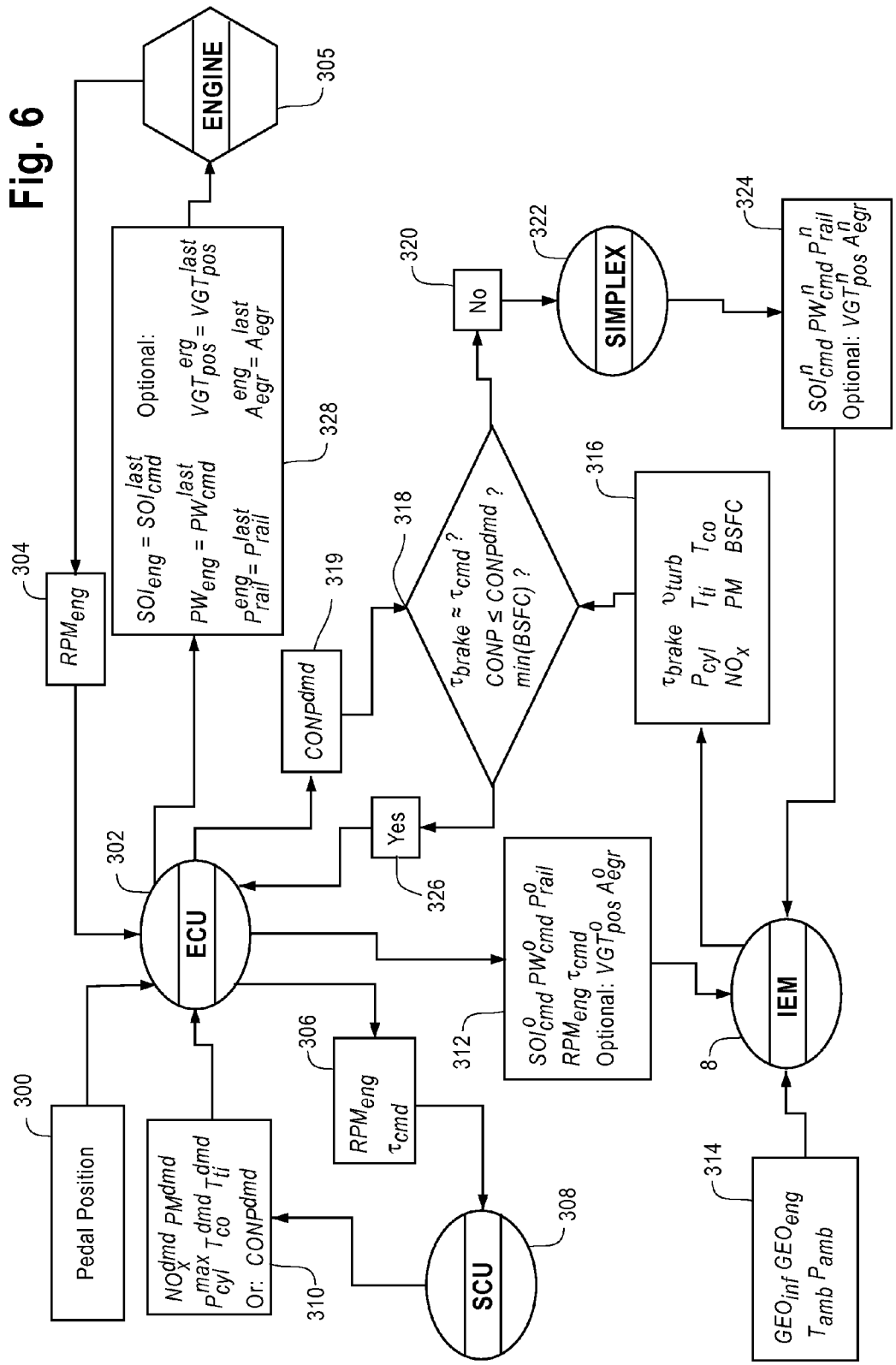
FIG. 6 shows the data flow path wherein the integrated engine model is used for engine controls.

Referring to FIG. 6, the subject invention is described with one embodiment for use in an engine control environment. Here, operator command 300, from an operator or driver, provides an engine operating command. In this example, pedal position, a typical from a driver, is translated by a look-up table, in ECU 302, into torque command, $\tau_{cmd}$. This $\tau_{cmd}$ is directed with engine speed, $RPM_{eng}$, to ECU 302 from engine 305, see data file 304, to Supervisory Control Unit (SCU) 308, collectively referred to as SCU input data 306. SCU 308 provides, from $\tau_{cmd}$, operating boundary data 310 for engine operation to ECU 302. These include maximum cylinder pressure ($P_{cyl}^{max}$), and can include demanded particulate emissions ($PM_{dmd}$), demanded NOx emissions ($NO_x^{dmd}$), demanded temperature at turbine inlet ($T_{ti}^{dmd}$) and demanded temperature at compressor outlet ($T_{cp}^{dmd}$). A modified torque can also be included where torque is to be kept within a certain range.

System data is then provided to IEM 8 to allow it to calculate output data. Specifically, ECU 302 provides to IEM 8 a subset of input data 312, namely an initial injector command, in this case, an initial start of injection ($SOI_{cmd}^{0}$), an initial rail pressure ($P_{rail}^{0}$), an initial pulse width ($PW_{cmd}^{0}$), and $\tau_{cmd}$ and $RPM_{eng}$ from SCU input data 306. Optionally, an initial variable geometry turbine position ($VGT_{pos}^{0}$ and initial effective EGR valve flow area ($A_{egr}^{0}$) can be provided where these variables reflect features of the subject engine. IEM 8 is also fed or stores base data 314, namely, $GEO_{ing}$, $GEO_{eng}$, $T_{amb}$ and $P_{amb}$, the latter two variables provided by appropriate sensors. It is also possible the engine would be calibrated for a given $T_{amb}$ and $P_{amb}$, in which case, an actual measurement or estimate of $T_{amb}$ and $P_{amb}$ would not be needed.

With system data, namely input data 312, and base data 314, IEM 8 can then provide output (predicted) data 316. For the purposes of control, output data should generally include engine out data including $\tau_{brake}$, an output control parameter which includes $P_{cyl}$ and can include $T_{ti}$, $T_{co}$, $NO_x$, $v_{turb}$ and PM and can include fuel consumption, usually BSFC. These values are then compared to sought torque, $\tau_{cmd}$) and any operating boundary data dictated by SCU 308 in data 310. In general, the demanded control parameter, $CONP^{dmd}$, which is a function of some operating boundary data 310, is compared to the generated control parameter provided in a first iteration, $CONP^n$. Two outcomes result through step 318. Where the relationship sought between $CONP^{dmd}$ provided through ECU 302 as parameter data 319, and $CONP^n$ and $\tau_{cmd}$ and $\tau_{brake}$ does not satisfy the conditions provided for in step 318, namely:

$$\tau_{brake} \approx \tau_{cmd} \quad (8)$$

$$CONP^n \leq CONP^{dmd} \quad (9)$$

where $$CONP^n = f(NO_x, PM, P_{cyl}, T_{co}, T_{ti}) \quad (10)$$

$$CONP^{dmd} = f(NO_x^{dmd}, PM^{dmd}, P_{cyl}^{max}, T_{co}^{dmd}, T_{ti}^{dmd}) \quad (11)$$

while the determined fuel consumption, BSFC, satisfies a minimum value to meet the conditions above (min (BSFC)), a further iteration is performed through step 320 to determine a new predicted data set 316. Specifically, a convergence algorithm for deriving a multi-dimensional solution, such as simplex 322, is used to generate a new set of input data 324 which is, along with $\tau_{cmd}$ and $RPM_{eng}$, delivered to IEM 8 to allow it to generate predicted data set 316. Each n iteration through input data 324 provides a subsequent injector command, again, in this case, start of injection ($SOI_{cmd}^0$, n=1, 2, ..., last), rail pressure ($P_{rail}^n$, n=1, 2, ..., last), pulse width ($PW_{cmd}^n$, n=1, 2, ..., last) and variable geometry turbine position ($VGT_{pos}^n$, n=1, 2, ..., last) and effective EGR valve flow area ($A_{egr}^n$, n=1, 2, ..., last), where appropriate.

Note, in general, $CONP^{dmd}$ is a function of $P_{cyl}^{max}$ as the cylinder pressure would always be constrained by the physical limitations of the cylinder and need to be monitored. The other variables noted in equation 11 can be added depending on the engine used and the variables of interest. Also, while the SCU 308 provides the parameters used to determine $CONP^{dmd}$, SCU 308 can also provide the relationship directly to ECU 302 or IEM 8 for use in step 318.

Eventually, step 318 will be satisfied resulting in step 326 through to ECU 302, where the last values generated for input data 324 are delivered to allow ECU 302 to then direct engine 305 to operate using the last derived injector command, namely, a start of injection ($SOI_{eng}$), a rail pressure ($P_{rail}^{eng}$) and a pulse width ($PW_{eng}$) and a variable geometry turbine position ($VGT_{pos}^{eng}$) and an effective EGR valve flow area ($A_{egr}^{eng}$), where appropriate, where each is set to the respective last value determined for $SOI_{cmd}^n$, $P_{rail}^n$, $PW_{cmd}^n$ and $VGT_{pos}^n$ and $A_{egr}^n$, where appropriate. That is, $$SOI_{eng} = SOI_{cmd}^{last} \quad (12)$$

$$PW_{eng} = PW_{cmd}^{last} \quad (13)$$

$$P_{rail}^{eng} = P_{rail}^{last} \quad (14)$$

$$VGT_{pos}^{eng} = VGT_{pos}^{last} \quad (15)$$

$$A_{egr}^{eng} = A_{egr}^{last} \quad (16)$$

In practice, such variables as the rate of change of pedal position are taken into consideration. The iterative process discussed above can be performed over a series of different pedal positions, which should provide a rate of change in the pedal positions being commanded of the operator.

The comparison made between the operator commands or the needs of the operator as compared to the conditions determined by IEM 8 as a possible means of meeting those needs is approximated within a range available for engine operation. That is, while the operator generally requires a given torque for his or her purposes, limitation of the engine physically or limitation set by SCU 308 for other reasons may prohibit the sought torque under a set of engine commands. As such, ECU 302 may use, as noted above, additional boundary data such as a modified torque able to approximate the operator demands and still operate within the physical boundaries of the engine and vehicle or turbine design.

In practice, ECU 302 can include all the components physically independent in FIG. 6. In other words, ECU 302, SCU 308, IEM 8 and Simplex 322 can be physically separated as suggested, but would likely be separate routines within the ECU 302 itself.

A further embodiment of the control strategy can include diagnostic capabilities that use an engine condition value indicative of a condition in the engine to monitor actual sensors in the engine. Here variations between predicted operating conditions and measured operating conditions can identify failures in such things as emissions sensors, EGR flow monitors, knock sensors and other combustion quality sensors, all of which could be fed, for such diagnostic analysis, to ECU 302 with predicted data 316 and input data 324 satisfying step 318. Faulty sensors can then be discovered and ignored by the ECU 302 for future cycles. On board diagnostic functions can be alerted as to the existence of faulty sensors and appropriate actions taken according to on-board-diagnostic regulations. As well, replacing those faulty sensor inputs with the IEM 8 generated values can be used for limited model-based engine control.

Still a further embodiment provides for a control strategy that works with in-cylinder pressure sensors. Comparisons can be made between the predicted values of cylinder conditions at or near start of combustion as predicted by IEM 8 and measured in-cylinder pressure sensors. This can help supplement controls of variable used to adjust start of combustion or combustion phasing.

Similarly, perturbations in variable rate injectors can be predicted and controlled by IEM 8 helping to enhance the dependability of such injectors which can help to capitalize on the value of such injectors.

For controls or predictive models, as would be understood by a person skilled in the art, the variables used by IEM 8 initially such as input data 312 or IN system data 20b can be other data that effectively provides the same information. For example while the injector commands of input data 312 include $SOI_{cmd}^0$, $P_{cmd}^0$, and $PW_{cmd}^0$, the injector commands can also be reflected by an initial $SOI_{cmd}$, $ROI_{cmd}$, and $Q_{fuel}$ with the same or similar results. Other variables can be used to determine and control fuel injection and combustion characteristics.

Example of IEM Operation

IEM 8 integrates each of IEMs 4 modules, IM 10, CM 12, ECM 14 and EM 16, consisting of a number of data files, which can be held in independent directories depending on their properties and functions.

An example of the subject method for engine behavior prediction is provided. The example does not limit the scope of the invention but is meant only for the purposes of illustrating an embodiment of the invention. For IM 10, the data files used include control files, $P_{cyl}^0$ and $P_{cyl}$ files, command files, and output files. The control file defines $SOI_{cmd}$ and $PW_{cmd}$ of injection signals and are, therefore, a subset of IM system data 20b. By way of example, the following is typical of this file structure:

| 12 | | | |
|---|---|---|---|
| 0.0 | 0.0 | 0.0 | 0.0 |
| 1.000 | 0.0 | 0.0 | 0.0 |
| 1.010 | 1.0 | 0.0 | 50.0 |
| 1.100 | 1.0 | 0.0 | 50.0 |
| 1.110 | 1.0 | 0.0 | 0.0 |
| 1.140 | 1.0 | 0.0 | 0.0 |

-continued

| | 12 | | |
|---|---|---|---|
| 1.150 | 1.0 | 0.0 | 9.0 |
| 1.700 | 1.0 | 0.0 | 9.0 |
| 1.701 | 1.0 | 2.0 | 9.0 |
| 3.000 | 1.0 | 2.0 | 9.0 |
| 3.010 | 0.0 | 0.0 | 0.0 |
| 10.000 | 0.0 | 0.0 | 0.0 | which defines the time (first column in ms) and commanded opening and closing timings (second column) where zero means closing, one means opening. In the example, referring to IM system data 20b, $P_{rail}$ is a constant, an example of the value for a gaseous fuelled engine being 185e5 Pa.

Additionally IM 10 requires, $P_{cyl}^0$ data files, files that hold $P_{cyl}^0$ data 19. By way of example, a backpressure file could look like:

| 1440 | 0.5 | |
|---|---|---|
| 0.0 | 41.173 | 745.985 |
| 0.5 | 42.314 | 751.362 |
| 1.0 | 43.493 | 756.802 |
| 1.5 | 44.711 | 762.306 |
| 2.0 | 45.969 | 767.871 |
| 2.5 | 47.269 | 773.498 |
| 3.0 | 48.611 | 779.186 |
| ... | | |
| 717.0 | 35.070 | 715.074 |
| 717.5 | 36.005 | 720.065 |
| 718.0 | 36.971 | 725.121 |
| 718.5 | 37.970 | 730.240 |
| 719.0 | 39.002 | 735.424 |
| 719.5 | 40.069 | 740.671 |

The first line provides total number of $P_{cyl}^0$ data points in the file and the crank angle interval between data points. From the second line forward, as an initial reading, the crank angle (CA) is provided in the first column, and $P_{cyl}^0$, measured in bar, is provided in the second column. In this example, $P_{cyl}^0$ starts from zero degrees CA, which corresponds to zero timing of the control file. A reading of 0 CA of the $P_{cyl}^0$ file does not mean TDC of an engine cycle, but means the start point of the control file. The injection timing corresponding to an engine cycle can be varied by changing the starting point of $P_{cyl}^0$.

Note as well, that $P_{cyl}^0$ is, as mentioned above, an estimate of the backpressure in the system at issue. In general, this estimate can come from data generated on an actual engine with similar operational and physical specifications. Also, $P_{cyl}^0$ could be set equal to the cylinder pressure determined from a previous converged pressure value (as is the case for $Q_{in}^0$, see below). However, where such a file is not available, a constant pressure, while a crude estimate, can be used for $P_{cyl}^0$. After iterations of big loop 118, $P_{cyl}$ will provide a more indicative measure of backpressure during the course of an engine cycle on the engine at issue. An example of a constant $P_{cyl}^0$ could be 10.0e5 kPa.

The command file for IM 10, IM system data 20b, defines the injector settings and operational conditions. These are operator driven and provide parameters of the system considered or system controlled. The data includes the variables and constants found in IM system data 20b and IN input data 19 as well as typical specifications required for the modules to operate and defining the boundaries of the iteration, for example, how long to run the model, the maximum time step allowed, where to output results.

Also, measured or redefined values for $RPM_{eng}$ and measured values for $P_{amb}$ are used. An example of $RPM_{eng}$ is 1740 and $P_{amb}$ is 1.0e5 Pa. This will allow big loop 118 to commence by initiating IM 10.

Also, $GEO_{inj}$ file could be referred to where the file would include, typically, information such as:

| | |
|---|---|
| Needle diameter | [mm] |
| Needle mass | [gram] |
| Needle stiffness | [N/m] |
| Plunger diameter | [mm] |
| Plunger mass | [gram] |
| Plunger stiffness | [N/m] |
| Injector hole effective flow area | [mm²] |
| Injector hole L/D ratio | |
| Needle seat angle | [degree] |
| Needle spring mass | [gram] |
| Needle spring stiffness | [N/m] |
| Plunger spring mass | [gram] |
| Plunger spring stiffness | [N/m] |

Typical units are provided in the right hand column.

With $SOI_{cmd}$, $PW_{cmd}$, $P_{cyl}^0$, $P_{rail}$, $P_{amb}$, $RPM_{eng}$ plus $GEO_{inj}$, all noted above, typical output data files can be generated from IM 10. The main file to be used by IEM 8 is the formatted file, an example of which is provided below:

| 1740.0 | −4.8 | 164.34 | | |
|---|---|---|---|---|
| −30.0 | 0.00000E+00 | 0.00000E+00 | 0.00000E+00 | 0.00000E+00 |
| −29.0 | 0.00000E+00 | 0.00000E+00 | 0.00000E+00 | 0.00000E+00 |
| −28.0 | 0.00000E+00 | 0.00000E+00 | 0.00000E+00 | 0.00000E+00 |
| −27.0 | 0.00000E+00 | 0.00000E+00 | 0.00000E+00 | 0.00000E+00 |
| −26.0 | 0.00000E+00 | 0.00000E+00 | 0.00000E+00 | 0.00000E+00 |
| −25.0 | 0.00000E+00 | 0.00000E+00 | 0.00000E+00 | 0.00000E+00 |
| ... | | | | |
| −5.0 | 0.00000E+00 | 0.00000E+00 | 0.00000E+00 | 0.00000E+00 |
| −4.0 | 0.26492E−06 | 0.00000E+00 | 0.00000E+00 | 0.00000E+00 |
| −3.0 | 0.18489E−05 | 0.00000E+00 | 0.00000E+00 | 0.00000E+00 |
| −2.0 | 0.38032E−05 | 0.00000E+00 | 0.00000E+00 | 0.00000E+00 |
| −1.0 | 0.50160E−05 | 0.00000E+00 | 0.00000E+00 | 0.00000E+00 |
| 0.0 | 0.56768E−05 | 0.00000E+00 | 0.00000E+00 | 0.00000E+00 |
| 1.0 | 0.61400E−05 | 0.00000E+00 | 0.00000E+00 | 0.00000E+00 |

-continued

| | | | | |
|---|---|---|---|---|
| 1740.0 | −4.8 | 164.34 | | |
| 2.0 | 0.65121E−05 | 0.00000E+00 | 0.00000E+00 | 0.00000E+00 |
| 3.0 | 0.68056E−05 | 0.00000E+00 | 0.00000E+00 | 0.00000E+00 |
| 4.0 | 0.68804E−05 | 0.00000E+00 | 0.00000E+00 | 0.00000E+00 |
| 5.0 | 0.69018E−05 | 0.00000E+00 | 0.00000E+00 | 0.00000E+00 |
| ... | | | | |
| 65.0 | 0.00000E+00 | 0.00000E+00 | 0.00000E+00 | 0.00000E+00 |
| 66.0 | 0.00000E+00 | 0.00000E+00 | 0.00000E+00 | 0.00000E+00 |
| 67.0 | 0.00000E+00 | 0.00000E+00 | 0.00000E+00 | 0.00000E+00 |
| 68.0 | 0.00000E+00 | 0.00000E+00 | 0.00000E+00 | 0.00000E+00 |
| 69.0 | 0.00000E+00 | 0.00000E+00 | 0.00000E+00 | 0.00000E+00 |
| 70.0 | 0.00000E+00 | 0.00000E+00 | 0.00000E+00 | 0.00000E+00 |

The first number being $RPM_{eng}$, followed by SOI (measured in degree of crank angle rotation relative to top dead center), and total fuelling (measured in mg/shot). The first column is degrees of crank angle rotation and the second column is ROI (measured in [kg/ca] in this case). $Q_{fuel}$ is derived from an integration of ROI data as would be understood by a person skilled in the art. The gap in data between crank angles −25 and −5 and 5 and 65 is given for economy. The data file would not include these gaps.

The result is IM 10 generating IM/CM data 27 and IM/ECM/EM data 25.

Having generated IN/CM data 27, CM 12 uses this data plus its own data file, CM input data 21, (and $Q_{egr}^{0}$ if EGR is a consideration in the engine considered) as well as CM system data 21b, $RPM_{eng}$ and $GEO_{eng}$. An example of initial CM input data 21 with EGR is $Q_{in}^{0}$=1500.0 kg/hr and $Q_{egr}^{0}$=300.0 kg/hr for natural gas.

CM 12 provides CM/ECM data 29 in a file for use by ECM 14. An example of such a file is:

| | |
|---|---|
| −20 | 0 |
| −19 | 0 |
| −18 | 0 |
| −17 | 0 |
| −16 | 0 |
| −15 | 0 |
| ... | |
| −5 | 5.36444E−08 |
| −4 | 1.42945E−05 |
| −3 | 0.00012872 |
| −2 | 0.00034991 |
| −1 | 0.000618775 |
| 0 | 0.000939128 |
| 1 | 0.001366183 |
| 2 | 0.00197213 |
| 3 | 0.002863935 |
| 4 | 0.00416602 |
| 5 | 0.006229198 |
| ... | |
| 95 | 0 |
| 96 | 0 |
| 97 | 0 |
| 98 | 0 |
| 99 | 0 |
| 100 | 0 |

The CA rotation relative to top dead center is provided in the left hand column and HRR is provided in the right hand column. As would be understood by a person skilled in the art, SOC is provided with CM/ECM data 12, derived from the HRR data.

Iterations through CM 12 and ECM 14 are run with small loop 98 replacing estimated $Q_{in}^{0}$, $Q_{egr}^{0}$ with $Q_{in}^{n}$, $Q_{egr}^{n}$ converging to $Q_{in}$, $Q_{egr}$ as taught above. An example of $Q_{in}^{n}$ after completion of a small iteration loop is 1661.9 kg/hr. An example of the resulting data file provided to IM 10 for a subsequent big loop 162 is:

| Symbol | Value |
|---|---|
| $RPM_{eng}$ | 1740.0 rpm |
| $\tau_{brake}$ | 1493.4 Nm |
| $P_{brake}$ | 281.5 kW |
| BSFC | 0.2177 kg/kW h |
| $P_{co}$ | 3.05 bar |
| $T_{co}$ | 441.8 K |
| $Q_{in}$ | 1661.9 kg/h |
| $Q_{fuel}$ | 51.500 kg/h |
| SOI | −30.0 CA |
| $Q_{egr}$ | 415.0 kg/hr |
| $T_{ti}$ | 818.0 K |
| $P_{ti}$ | 2.855 bar |

Not all of data is used by IM 10 during each loop as described above. The above is also indicative of the data generated by ECM should the iteration of big loop end.

ECM 14 with HRR and SOC provides $P_{cyl}$, an example of which is:

| | |
|---|---|
| −150 | 3.02653 |
| −149.5 | 3.03322 |
| −149 | 3.04004 |
| −148.5 | 3.047 |
| −148 | 3.0541 |
| ... | |
| 567 | 2.99286 |
| 567.5 | 2.99874 |
| 568 | 3.00475 |
| 568.5 | 3.01089 |
| 569 | 3.01716 |
| 569.5 | 3.02357 | where CA is provided in the first column and $P_{cyl}$, in bar, is provided in the second column. Engine performance data, engine output data 38, ECM/EM data 33 and IM/ECM/EM data 25, is provided where no further iterations of big loop are required as determined by $\epsilon_P$ after a comparison of $P_{cyl}^{n}$ with $P_{cyl}^{n-1}$, an example of which is:

| Symbol | Value |
|---|---|
| $RPM_{eng}$ | 1740.0 rpm |
| $\tau_{brake}$ | 1493.4 Nm |
| $P_{brake}$ | 281.5 kW |

-continued

| Symbol | Value |
|---|---|
| BSFC | 0.2177 kg/kW h |
| $P_{co}$ | 3.05 bar |
| $T_{co}$ | 441.8 K |
| $Q_{in}$ | 1661.9 kg/h |
| $Q_{fuel}$ | 51.500 kg/h |
| SOI | −30.0 CA |
| $Q_{egr}$ | 415.0 kg/hr |
| $T_{ti}$ | 818.0 K |
| $P_{ti}$ | 2.855 bar |
| $P_{ivc}$ | 2.969 bar |

After iterations through big loop 118, an example of $P_{cyl}$ from ECM 14, when $P_{cyl}$ is set to $P_{cyl}^n$ as described above, is:

| | |
|---|---|
| −360.000 | 1.749 |
| −359.500 | 1.751 |
| −359.000 | 1.756 |
| −358.500 | 1.762 |
| −358.000 | 1.770 |
| −357.500 | 1.778 |
| −357.000 | 1.786 |
| ... | |
| 357.000 | 1.784 |
| 357.500 | 1.773 |
| 358.000 | 1.764 |
| 358.500 | 1.757 |
| 359.000 | 1.752 |
| 359.500 | 1.749 |
| 360.000 | 1.749 |

With the complete set of IM/ECM/EM data 25, ECM/EM data 16 and EM system data 39, emissions data 41 is generated from EM 16. An example of $NO_x$ based on the above is 295.3 ppm.

A higher number of iterations through big loop 118 helps to refine the accuracy prior to full generation of the ultimate output data, engine output data 38 and emissions data 41, from ECM 14 and EM 16. As well, the basis of this output data, data from IM 10 and CM 12, IM/ECM/EM data 25, IM/CM data 27 and CM/ECM data 29, is refined as well. Typically four iterations of big loop for an example such as the one above would be reasonable.

CM 12 developed for directly injected gaseous fuel combustion is useful for the subject invention. The desired pressure at which gaseous fuels are injected into the combustion chamber of an internal combustion engine are dependent on $P_{cyl}$ to a far greater extent than is the case for liquid direct injection engines. Diesel fuel is injected at pressures that can be an order of magnitude higher than is the case for natural gas. As such, the range in $P_{cyl}$ is not as important to IM 10 accuracy. Therefore, when considering a gaseous-fuelled engine, IEM 8 incorporating $P_{cyl}$ derived from ECM 14 after completion of big loop 118, allows improved accuracy in IM 10 as well as improved functionality in IEM 8. Where liquid fuels are used however, there is less need for refining the value of $P_{cyl}$ as is done through the iteration described above. As such, there has been less need to deal with this aspect of liquid direct injection engines.

For the purposes of this application, the sub-modules, IM 10, CM 12, ECM 14 and EM 16 include the prior art examples discussed above and may vary depending on the application of the user: see background discussion.

While particular elements, embodiments and applications of the present invention have been shown and described, it will be understood, that the invention is not limited thereto since modifications may be made by those skilled in the art without departing from the scope of the present disclosure, particularly in light of the foregoing teachings.

Nomenclature Table

| Abbreviation | Definition |
|---|---|
| IEM | Integrated engine model |
| IM | Injector module |
| CM | Combustion module |
| ECM | Engine cycle module |
| EM | Emissions module |
| $P_{cyl}^0$ | Initial cylinder pressure |
| $Q_{in}^0$ | Initial intake flow rate |
| $Q_{egr}^0$ | Initial EGR rate |
| $GEO_{inj}$ | Injector geometry |
| $P_{cyl}^n$ | Iterative cylinder pressure |
| $P_{rail}$ | Rail pressure |
| $SOI_{cmd}$ | Commanded or desired start of injection |
| $PW_{cmd}$ | Commanded or desired pulse width |
| $RPM_{eng}$ | Speed of engine |
| $P_{amb}$ | Ambient pressure |
| $GEO_{eng}$ | Engine geometry |
| $T_{amb}$ | Ambient temperature |
| $A_{egr}$ | Effective EGR valve flow area |
| $VGT_{pos}$ | Variable geometry turbine position |
| $P_{brake}$ | Brake power |
| $\tau_{brake}$ | Brake torque |
| BSFC | Brake specific fuel consumption |
| $NO_x$ | Emissions of oxides of nitrogen |
| PM | Particulate matter emission |
| $Q_{in}$ | Intake flow rate |
| $P_{cyl}$ | Cylinder pressure |
| $T_{ti}$ | Turbine inlet temperature |
| $P_{ti}$ | Turbine inlet pressure |
| $T_{co}$ | Compressor outlet temperature |
| $P_{co}$ | Compressor outlet pressure |
| $v_{turb}$ | Turbine speed |
| $Q_{egr}$ | EGR flow rate |
| $Q_{exh}$ | Exhaust flow rate |
| HRR | Heat release rate |
| ROI | Rate of injection |
| SOI | Start of injection |
| $Q_{fuel}$ | Fuel supply rate |
| SOC | Start of combustion |
| $Q_{in}^n$ | Iterative intake flow rate |
| $Q_{egr}^n$ | Iterative EGR flow rate |
| $P_{ivc}$ | Intake valve closing time cylinder pressure |
| $T_{ivc}$ | Intake valve closing time cylinder temperature |
| $Q_{in}^{n-1}$ | Previous cycle intake flow rate |
| $Q_{egr}^{n-1}$ | Previous cycle EGR flow rate |
| $\epsilon_Q$ | Intake air flow rate error |
| $\epsilon_{Qegr}$ | EGR flow rate error |
| $\epsilon_P$ | Cylinder pressure error |
| PW | Pulse width |
| $P_{im}$ | Intake manifold pressure |
| $V_{eff}$ | Effective volume of cylinder |
| $T_{exh}$ | Exhaust temperature |
| $T_{egr}$ | Temperature EGR |
| $\Delta r$ | Flow restriction of intake and exhaust |
| $\lambda$ | Air to fuel ratio |
| $T_{co}^{dmd}$ | Demanded compressor outlet temperature limit |
| $T_{ti}^{dmd}$ | Demanded turbine inlet temperature limit |
| $P_{cyl}^{max}$ | Maximum cylinder pressure |
| $PM^{dmd}$ | Demanded particulate matter emission |
| $NO_x^{dmd}$ | Demanded emissions of oxides of nitrogen |
| $\tau_{cmd}$ | Commanded brake torque |
| $SOI_{cmd}^0$ | Initial commanded start of injection |
| $PW_{cmd}^0$ | Initial commanded pulse width of injection of fuel |
| $P_{rail}^0$ | Initial commanded rail pressure |
| $VGT_{pos}^0$ | Initial commanded variable geometry turbine position |

-continued

Nomenclature Table

| Abbreviation | Definition |
| --- | --- |
| $A_{egr}^{0}$ | Initial commanded effective EGR valve flow area |
| CONP | Control parameter |
| $CONP^{dmd}$ | Demanded control parameter |
| $SOI_{cmd}^{n}$ | Iterative commanded start of injection |
| $PW_{cmd}^{n}$ | Iterative commanded pulse width of injection of fuel |
| $P_{rail}^{n}$ | Iterative commanded rail pressure |
| $VGT_{pos}^{n}$ | Iterative commanded variable geometry turbine position |
| $A_{egr}^{n}$ | Iterative commanded effective EGR valve flow area |
| $SOI_{eng}$ | Start of injection control command to engine |
| $PW_{eng}$ | Pulse width of injection of fuel command to engine |
| $P_{rail}^{eng}$ | Rail pressure command to engine |
| $VGT_{pos}^{eng}$ | Variable geometry turbine position command to engine |
| $A_{egr}^{eng}$ | Effective EGR valve flow area command to engine |
| $SOI_{cmd}^{last}$ | Final iterative commanded start of injection |
| $PW_{cmd}^{last}$ | Final iterative commanded pulse width of injection of fuel |
| $P_{rail}^{last}$ | Final iterative commanded rail pressure rail |
| $VGT_{pos}^{last}$ | Final iterative commanded variable geometry turbine position |
| $A_{egr}^{last}$ | Final iterative commanded effective EGR valve flow area |

What is claimed is:

1. A method of controlling a direct injection internal combustion engine, said method comprising:
   (a) calculating output data from system data, said system data comprising:
      (1) an injector geometry defined by a fuel injector in fluid communication with a combustion chamber of said engine,
      (2) an engine geometry defined by said engine,
      (3) an engine operating command based on a desired engine output,
      (4) an initial injector command,
      (5) an engine speed,
   said engine operating command being indicative of a commanded torque for said engine, said output data comprising:
      an engine out value indicative of a brake torque delivered by said engine, and
      an output control parameter indicative of a cylinder pressure value,
   (b) when said output data does not satisfy a predetermined relationship, determining a subsequent injector command and recalculating said output data with said subsequent injector command, where said predetermined relationship compares said output data and said engine operating command and a demanded control parameter, said demanded control parameter being indicative of a maximum cylinder pressure value,
   (c) when said output data satisfies said predetermined relationship, commanding said injector to provide fuel to said combustion chamber according to a last injector command.

2. The method of claim 1 wherein said system data further comprises an ambient temperature and an ambient pressure.

3. The method of claim 2 wherein said ambient temperature and said ambient pressure are measured prior to calculating said output data.

4. The method of claim 1 wherein said engine speed is measured prior to calculating said output data.

5. The method of claim 2 wherein said engine operating command is converted to said commanded torque based on an operator selected pedal position.

6. The method of claim 1 wherein said demanded control parameter is determined from said engine operating command.

7. The method of claim 1 wherein said output control parameter is indicative of calculated emissions and said demanded control parameter is indicative of a demanded emission.

8. The method of claim 7 wherein said calculated emissions and said demanded emissions are indicative of at least one of a NOx concentration and a particulate matter concentration.

9. The method of claim 1 wherein said predetermined relationship further comprises comparing said output data with at least one previously calculated fuel consumption determined from said system data using said initial injector command or said subsequent injector command, said output data further comprising said calculated fuel consumption.

10. The method of claim 9 wherein said predetermined relationship comprises said calculated fuel consumption being less than said at least one previously calculated fuel consumption.

11. The method of claim 1 wherein:
   said initial injector command comprises a commanded initial start of injection, a commanded initial pulse width and a commanded initial rail pressure,
   said subsequent injector command comprises a commanded subsequent start of injection, a commanded subsequent pulse width and a commanded subsequent rail pressure, and
   said last injector command comprises a commanded last start of injection, a commanded last pulse width and a commanded last rail pressure.

12. The method of claim 1 wherein said engine further comprises a variable geometry turbine and said system data further comprises an initial variable geometry turbine position, further comprising:
   when said output data does not satisfy said predetermined relationship, determining a subsequent variable geometry turbine position, with said subsequent variable geometry turbine position and said subsequent injector command, recalculating said output data, and
   when said output data satisfies said predetermined relationship, commanding said variable geometry turbine according to a last variable geometry turbine position.

13. The method of claim 1, wherein said engine further comprises an EGR system and said system data further comprises an initial effective EGR valve flow area, further comprising:
   when said output data does not satisfy said predetermined relationship, determining a subsequent effective EGR valve flow area, with said subsequent effective EGR valve flow area and said subsequent injector command, recalculating said output data,
   when said output data satisfies said predetermined relationship, commanding said EGR system according to a last effective EGR valve flow area.

14. The method of claim 1 wherein said output data is calculated using:

an injector module for calculating IM/CM data and IM/ECM data from an estimated initial cylinder pressure and IM system data, said IM system data being a subset of said system data, a combustion module for calculating CM/ECM data from an estimated initial intake flow rate, said IM/CM data and CM system data, said CM system data being a subset of said system data, an engine cycle module for calculating said output data from said CM/ECM data, said IM/ECM data and said ECM system data, said ECM system data being a subset of said system data, wherein, prior to calculating said output data, a small loop between said combustion model and said engine cycle module is used to provide a converged intake flow rate and, a big loop between said injection module, said combustion module and said engine cycle module is used to provide a converged cylinder pressure, said converged cylinder pressure used to provide said cylinder pressure value.

15. The method of claim 14 wherein said IM/CM data comprises an IN rate of injection and an IM start of injection.

16. The method of claim 14 wherein said IM/ECM data comprises an IN fuel flow and an IM start of injection.

17. The method of claim 14 wherein said CM/ECM data comprises a CM heat release rate and a CM start of combustion.

18. The method of claim 14 wherein said output data is further calculated using an emissions module for calculating emissions data from ECM/EM data, said IM/ECM data and said system data, said output control parameter being indicative of calculated emissions and said demanded control parameter being indicative of a demanded emission.

19. The method of claim 14 wherein said IM system data comprises an ambient pressure, said injector geometry, said engine speed and said injector command.

20. The method of claim 14 wherein said CM system data comprises said engine speed and said engine geometry.

21. The method of claim 14 wherein said ECM system data comprises an ambient pressure, an ambient temperature, said engine geometry and said engine speed.

22. The method of claim 1 wherein said engine is fuelled, at least partially, by a gaseous fuel.

23. The method of claim 22 wherein said gaseous fuel is natural gas.

24. The method of claim 22 wherein said gaseous fuel comprises at least one of methane, hydrogen, ethane and propane.

25. The method of claim 22 wherein said gaseous fuel is hydrogen.

26. A method of controlling a direct injection internal combustion engine, said method comprising:
 (a) calculating output data from system data, said system data comprising:
  (1) an injector geometry defined by a fuel injector in fluid communication with a combustion chamber of said engine,
  (2) an engine geometry defined by said engine,
  (3) an engine operating command based on a desired engine output,
  (4) an initial injector command, and
  (5) an engine speed,
 said engine operating command being indicative of a commanded torque for said engine, said output data comprising:
  (i) an engine condition value indicative of a condition within said engine,
  (ii) an engine out value indicative of a brake torque delivered by said engine, and
  (iii) an output control parameter indicative of a cylinder pressure value,
 (b) when said output data does not satisfy a predetermined relationship, determining a subsequent injector command and recalculating said output data with said subsequent injector command, where said predetermined relationship compares said output data and said engine operating command and a demanded control parameter, said demanded control parameter being indicative of a maximum cylinder pressure value,
 (c) when said output data satisfies said predetermined relationship, comparing said engine condition value to a sensor reading to determine accuracy of said sensor reading.

27. The method of claim 26 wherein said engine condition value comprises in-cylinder pressure and said sensor reading comprises an in-cylinder pressure sensor reading.

* * * * *